(12) United States Patent
Lee et al.

(10) Patent No.: US 8,291,462 B2
(45) Date of Patent: Oct. 16, 2012

(54) BROADCAST RECEIVER, BROADCAST DATA TRANSMITTING METHOD AND BROADCAST DATA RECEIVING METHOD

(75) Inventors: Joon Hui Lee, Seoul (KR); Mun Youl Lee, Anyang-si (JP); Jin Pil Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 628 days.

(21) Appl. No.: 12/219,320

(22) Filed: Jul. 18, 2008

(65) Prior Publication Data

US 2009/0125945 A1    May 14, 2009

(30) Foreign Application Priority Data

Jul. 19, 2007    (KR) .................. 10-2007-0072353
Aug. 7, 2007    (KR) .................. 10-2007-0079138

(51) Int. Cl.
    *H04N 5/445*     (2011.01)
    *H04N 7/173*     (2011.01)

(52) U.S. Cl. ........................................ 725/105

(58) Field of Classification Search .................. None
See application file for complete search history.

(56) References Cited

U.S. PATENT DOCUMENTS

| | | | | |
|---|---|---|---|---|
| 7,512,401 B2 * | 3/2009 | Muhonen et al. | ........... | 455/414.1 |
| 2007/0064637 A1 * | 3/2007 | Lee et al. | ....................... | 370/312 |
| 2007/0064811 A1 * | 3/2007 | Zador et al. | ............. | 375/240.26 |
| 2007/7064811 | 3/2007 | Zador et al. | | |
| 2007/0118872 A1 * | 5/2007 | Song et al. | .................... | 725/135 |

FOREIGN PATENT DOCUMENTS

| | | |
|---|---|---|
| EP | 1 503 589 A1 | 2/2005 |
| WO | WO 2006/057938 A2 | 6/2006 |
| WO | WO 2007084814 A2 * | 7/2007 |

OTHER PUBLICATIONS

Digital Video Broadcasting (DVB); transport of MPEG-2 based DVB services over IP based Networks, Sep. 2006, european broadcasting union, ETSI TS 102 034 V1.2.1.*
European Broadcast Union, ETSI TS 102 034, Oct. 2007, ETSI European Telecomm/Broadcast Union, V1.3.1, p. 31-32.*
DVB, Transport of MPEG 2 (TS) based DVB services over IP based networks, Mar. 2007, DVB document A086 Rev. 4, Table 4, p. 27-28.*
"Digital video Broadcasting (DVB); Transport of MPEG-2 Based DVB Services Over IP Based Networks", XP014039759, V1.2.1, 2006.

* cited by examiner

*Primary Examiner* — Vivek Srivastava
*Assistant Examiner* — Rong Le
(74) *Attorney, Agent, or Firm* — McKenna Long & Aldridge LLP

(57) ABSTRACT

A broadcast receiver, broadcast data transmitting method and broadcast data receiving method are disclosed, by which information on a service provided by a service provider can be provided, by which a preview can be provided, and by which a time taken for a channel switching can be reduced. The present invention includes transmitting service provider discovery information including information on a service provider, transmitting service discovery information including information on a service provided to the service provider, and transmitting a stream for the service to a connected receiver.

13 Claims, 24 Drawing Sheets

| Index | Type | Description |
|---|---|---|
| 1 | PreviewCategory | Classify what kind of substance a preview contains (ex. Series, sports, action, art, etc.) |
| 2 | PreviewMediaType@id | ID of predefined media format type (ex., image, moving picture, audio, text) |
| 3 | DisplayMode | Method of a display type in displaying media (e.g., slide, trail, etc.) |
| 4 | Position | Designate location at which preview will be displayed |
| 5 | Size | Size of media |
| 6 | StartTime | Timing point of initiating preview |
| 7 | Duration | Time for displaying preview |
| 8 | PreviewDescription | Simple description for preview |
| 9 | MediaLocator | Address of media file having preview (all the protocols are available by URI) |
| 10 | AssociatedMediaLocator | Address of content associated with preview (CRID) |

FIG. 6

```
<xsd:complexType name="PreviewService">
 <xsd:sequence>
  <xsd:element name="ServiceLocation" type="dvb:ServiceLocation"/>
  <xsd:element name="DVBTriplet" type="dvb:DVBTriplet" minOccurs="0"/>
  <xsd:element name="MaxBitrate" type="xsd:positiveInteger" minOccurs="0"/>
  <xsd:element name="AudioAttibutes" type="tva:AudioAttributesType" minOccurs="0" maxOccurs="unbounded"/>
  <xsd:element name="VideoAttibutes" type="tva:VideoAttributesType" minOccurs="0" maxOccurs="unbounded"/>
 </xsd:sequence>
 <xsd:attribute name="preferred" type="xsd:boolean"/>
</xsd:complexType>
```

FIG. 7A

| Element/Attribute Name | Element/Attribute Description | Mandated/Optional |
|---|---|---|
| BroadcastOffering type: | /BroadcastDiscovery | |
| IPServiceList type (one per service list): | /BroadcastDiscovery/ServiceList | |
| ServicesDescriptionLocation | If present, this shall contain the identifier(s) of the BCG Record(s) for the BCG Discovery element that carries the information on this offering. | O |
| @preferred | If present, specifies that this location contains the preferred BCG. The default value for this attribute is false. There shall be only one preferred BCG. | O |
| IPService type (one enter per service): | /BroadcastDiscovery/ServiceList/SingleService | |
| TextualIdentifier@DomainName | An internet DNS domain name registered by the Service Provider that uniquely identifies the Service Provider. If this is not present, then the DNS domain name from the DVB IP Offering record is used. | O |
| TextualIdentifier@ServiceName | A unique host name for the service within the service provider's domain. | M |
| DVBTriplet@OrigNetId | Identifies the network Id of the originating delivery system. | M |
| DVBTriplet@TSId | Identifies the Transport Stream. | M |
| DVBTriplet@ServiceId | Identifies a service from any other service within the TS. The service Id is the same as the program number in the corresponding program map table. | M |
| MaxBitrate | Specifies the maximum bitrate of the overall stream carrying the service. | O |
| ServiceLocation type(one entry per service location): | /BroadcastDiscovery/ServiceList/SingleService/Service Location At least one of IPMulticastAddress or RTSPURL must be present. | |
| IPMulticastAddress | Signals the use of IGMP to access the service and provides the multicast address at which the service may be accessed. | |
| IPMulticastAddress@Source | Optionally the IP unicast address of the source of the TS may be provided. | O |
| IPMulticastAddress@Address | Provides the multicast address at which the service may be accessed. | M (see note) |
| IPMulticastAddress@Port | Provides the port at which the service may be accessed. | M (see note) |
| IPMulticastAddress@Streaming | Optionally indicates RTP or direct UDP streaming. In case the parameter is not provided, RTP streaming is assumed. | O |
| FECBaseLayer@Address FECBaseLayer@Port | IP Multicast Address for FEC Base Layer (SMPTE-2002-1) UDP port for FEC Base Layer If the IP multicast address is omitted, then the FEC flow is assumed to be on the same multicast address as the original data. If the port is omitted then no FEC is provided. | O O |
| FECEnhancementLayer@Address FECEnhancementLayer@Port | IP Multicast Address for FEC Enhancement Layer (Raptor)- - may be repeated for multiple layers UDP port for FEC Enhancement Layer If the IP multicast address is omitted, then the FEC flow is assumed to be on the same multicast address as the original data. If the port is omitted then no FEC Enhancement is provided. | O O |
| FECMaxBlockSizePackets | The maximum number of source packets sent from the first packet of a block (source or repair) to the last packet of a block (source or repair). | O |

FIG. 7B

| | | | |
|---|---|---|---|
| FECMaxBlockSizeTime | | The maximum Transmission duration of any FEC Block (source and repair packets) | 0 |
| FECObjectTransmissionInformation | | The FEC Object Transmission information for the Raptor code<br>If an FECEnhancementLayer element is includeed then this element MUST be included. | 0 |
| | AudioAttributes | Signals details of the audio coding algorithms and purpose that the service may use. This shall take the form of the AudioAttributtes element defined in clause 6..3.5 of TS 102 822-3-1 [66] and used in TS 102 323 [65]. The classification scheme used for the Coding element shall either be defined by TS 102 323 [65]. or provided by the default value of document. If this element is omitted. then the default value of MPEG-1 or MPEG-2 layer 2 backwards compatible. mono or stereo shall be used : specifically this shall be the legacy value from TS 101 154 [64] | 0 |
| | VideoAttributes | Signals details of the video coding that may be used by the service. This shall take the form of the VideoAttributes element defined in clause 6.3.5 of TS 102 822-3-1 [66] and used in TS 102 323 [65]. The classification scheme used for the Coding element shall either be defined by TS 102 323 [65]. or provided by the present document. If this element is omitted. then the default value of MEPG-2 coded video. operating at MP@ML at a frame rate of 25Hz shall be used : specifically this shall be the legacy value from TS 101 154 [64]. | 0 |

FIG. 7C

| | | |
|---|---|---|
| Preview Service | Identifies a preview service which may be presented to users for assisting the selection of live media services through EPG. | O |
| @preferred | If present, specifies that this location contains the preferred preview service. The default value for this attribute is false. There shall be only one preferred preview service | O |
| DVBTriplet@OrigNetId | Identifies the network Id of the originating delivery system. | O |
| DVBTriplet@TSId | Identifies the Transport Stream. | O |
| DVBTriplet@ServiceId | Identifies a preview service from any other service within the present document. The service Id is the same as the program number in the corresponding program map table. | O |
| ServiceLocation type: | /BroadcastDiscovery/ServiceList/SingleService/Preview Service/ServiceLocation | |
| IPMulticastAddress@Source | Signals the use of IGMP to access the service and provides the URL and port at which the preview service may be accessed. Optionally the IP unicast address of the source of the present document may be provided. At least one of IPMulticastAddress or RTSPURL must be present. | O |
| IPMulticastAddress@Address | | M |
| IPMulticastAddress@Port | | M |
| RTSPURL | Signals the use of RTSP to access the preview service and provides the URL at which the preview service may be accessed. At least one of one of IP Multicast Address or RTSPURL must be present. | O |
| Max Bitrate | Specifies the maximum bitrate of the overall stream carrying the previcew service | O |
| AudioAttributes | Signals details of the audio coding algorithms and purpose that the preview service may use. This shall take the form of the audioattributes element defined in clause 6.1.1.1 of TS 102 822-3-3 [80] and used in TS 102 323 [69]. The classification schema used for the Coding element shall either be defined by TS 102 323 [69], or provided by the present document. If this element is omitted, then the default value of MPEG-1 or MPEG-2 layer 2 backwards compatible, mono or stereo shall be the "normal" audio; specifically this shall be the legacy value from TS 101 154 [68] | O |
| VideoAttributes | Signals details of the video coding that may be used by the service. This shall take the form of the VideoAttributes element defined in clause 6.1.1.2 of TS 102 822-3-3 [80] and used in TS 102 323 [69]. The classification schema used for the coding element shall either be defined by TS 102 323 [69], or provided by the present document. If this element is omitted, then the default value of MPEG-2 coded video, operating at MP@LL at a frame rate of 25Hz shall be used; specifically this shall be the legacy value from TS 101 154 [68]. | O |
| Service-Availability | This element provides support for regionalization. It allows each service to have a list of cells (regions) with which the service is associated. By default, all the single services are available everywhere. There shall be at most one ServiceAvailability element for each CountryCode. | O |
| CountryCode | This element indicates the country for which the availability is being defined. | M |
| @Availability | This flag indicates whether the service is available in the country specified by CountryCode. The default is TRUE. When TRUE, the service is abailable in the specified country with the execption of those regions identified by Cells. When FALSE the service is not abailable in the specified country with the exception of those regions identified by Cells. | O |
| Cells | A list of string identifiers representing geographical regions in the country identified by CountryCode. The cells listed represent the exception to the value supplied by the flag. i.e. the negation of the Availability flag applies to any listed cells. | O |
| NOTE: The Mandatory here means that if the Optional parent element is transmitted. then this field shall be present. | | |

FIG. 14

| Element /Attribute Name | | Element /Attribute Description | Mandated/ optional |
|---|---|---|---|
| BCGOffering type: | | /BCGDiscovery | |
| BCG | | BCG record | M |
| | BCG@id | Identifies a Broadband Content Guide Provider, Server this id is allocatted by the Service Provider | M |
| | BCG@Version | Version of this record. A change in this value indicates a change in one of the BCG Records | O |
| Name | | Name of the Broadband Content Guide offering for display in one or more languages : one name is allowed per language code, and at least one language shall be provided (though not necessarily more than one) | M |
| Description | | Description of the Broadband Content Guide for potential display in one or more languages; one description per language code | O |
| Logo | | A pointer to an optional logo for the content guide | O |
| Type | | This indicates if the content guide relates to live programs, content on demand, both, or some other form of content. The extensible classificition scheme provided in the present document shall be used | O |
| TargetProvider | | The domain name of the provider whose content is described by this BCG (for example Canal +), the domainName shall be the same as a domain name present in the Serviclist | O |
| TransportMode | | The location where the broadband content guide may be found | M |
| | DVBSTP | Specifies the location at which the content guide is available using the DVBSTP protocol, and details the relevant segments that are being transmitted | O |
| | http@Location | Specifies the location at which the guide may be found | M(if the http element is used) |
| | http@SOAP | Indicates if the guide may be queried using the SOAP protocol rather the mechanism outline in clause 5, 4, 2. The default value of this attribute is "false" | O |
| BCGProviderName | | The name of the BCG provider (for example "Telerama") this field shall be identical to the textual string of the publisher attribute of the TVAMain element in the BCG metadata | O |
| PreviewAvailability | | A boolean which indicates if the content preview is available, the availability of content preview is provided by Service provider. The default value is false. | O |
| | PreviewInformation | Specifies preview information including a media locator when the content preview is available. | O |

FIG. 15

| Index | Type | Description |
|---|---|---|
| 1 | PreviewCategory | Classify what kind of substance a preview contains (ex. Series, sports, action, art, etc.) |
| 2 | PreviewMediaType@id | ID of predefined media format type (ex., image, moving picture, audio, text) |
| 3 | DisplayMode | Method of a display type in displaying media (e.g., slide, trail, etc.) |
| 4 | Position | Designate location at which preview will be displayed |
| 5 | Size | Size of media |
| 6 | StartTime | Timing point of initiating preview |
| 7 | Duration | Time for displaying preview |
| 8 | PreviewDescription | Simple description for preview |
| 9 | MediaLocator | Address of media file having preview (all the protocols are available by URI) |
| 10 | AssociatedMediaLocator | Address of content associated with preview (CRID) |

FIG. 16

| MediaType | ID | Format | Description |
|---|---|---|---|
| Image | 1 | Image/gif | A GIF formatted image file |
| | 2 | Image/jpeg | A JPEG formatted image file |
| | 3 | Image/tiff | A TIFF formatted image file |
| | 4 | Image/x-xbitmap | An XBM formatted image file |
| Text | 5 | Text/Plain | A plain ascii text file |
| | 6 | Text/html | An HTML formatted text file |
| | 7 | Text/xml | An XML formatted text file |
| Audio | 8 | Audio/basic | A basic audio file format |
| | 9 | Audio/x-mpeg | An MPEG formatted audio file |
| | 10 | Audio/x-wav | WAV formatted audio file |
| Video | 11 | Video/quicktime | A Quicktime formatted video file |
| | 12 | Video/avi | An AVI formatted video clip |
| | 13-100 | | User defined |

BROADCAST RECEIVER, BROADCAST DATA TRANSMITTING METHOD AND BROADCAST DATA RECEIVING METHOD

This application claims the benefit of the Korean Patent Application No. 10-2007-72353, filed on Jul. 19, 2007, which is hereby incorporated by reference as if fully set forth herein. Also, This application claims the benefit of the Korean Patent Application No. 10-2007-79138, filed on Aug. 7, 2007, which is hereby incorporated by reference as if fully set forth herein.

BACKGROUND OF THE INVENTION

1. Field of the Invention

The present invention relates to broadcast data transmitting and receiving methods, and more particularly, to a broadcast receiver, broadcast data transmitting method and broadcast data receiving method.

2. Discussion of the Related Art

Generally, in a related art broadcast receiver, a content produced by a broadcasting station is transmitted via an electric wave carrier medium such as terrestrial, cable, satellite broadcasting and the like. A user then views the content received via a receiver capable of receiving the corresponding carrier medium.

As the digital broadcasting technology has been developed and commercialized from the conventional analog broadcasting, various kinds of content services such as real-time broadcasts, CoD (contents on demand), games, news and the like can be provided to users via internet network connected to homes as well as the conventional medium such as terrestrial, wireline cable and the like.

As an example for providing a content service using the internet network, there is IPTV (internet protocol TV). In the IPTV technology, various information services, moving picture contents, broadcasts and the like are transmitted via the internet network to be provided to a user's receiver. The internet network can be implemented on various kinds of networks including an optical cable network, a coaxial cable network, FTTH (fiber to the home), a phone network, a wireless network and the like based on IP (internet protocol).

In case of a service using the above-mentioned internet network, unlike the general terrestrial broadcast, interactivity can be added. Therefore, a user is facilitated to view a specific content service in a convenient time.

SUMMARY OF THE INVENTION

Accordingly, the present invention is directed to a broadcast receiver, broadcast data transmitting method and broadcast data receiving method that substantially obviate one or more problems due to limitations and disadvantages of the related art.

An object of the present invention is to provide a broadcast receiver, broadcast data transmitting method and broadcast data receiving method, by which information on a service provided by a service provider can be provided.

Another object of the present invention is to provide a broadcast receiver, broadcast data transmitting method and broadcast data receiving method, by which a preview can be provided.

A further object of the present invention is to provide a broadcast receiver, broadcast data transmitting method and broadcast data receiving method, by which a time taken for a channel switching can be reduced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting broadcast data according to the present invention includes transmitting service provider discovery information including information on a service provider, transmitting service discovery information including information on a service provided to the service provider, and transmitting a stream for the service to a connected receiver.

Preferably, in the stream transmitting step, the stream for the service of a display requested channel and the stream for the service of at least one buffering-set channel are transmitted. Herein, the buffering-set channel comprises at least one selected from the group consisting of a neighbor channel of the display requested channel, a previously viewed channel, a user-specific viewing reserved channel and a user-preferred channel.

Preferably, the information on the service includes information on a main service and a preview service of the main service. Herein, in the stream transmitting step, the stream for the preview service is transmitted.

More preferably, the service discovery information includes information on at least one preview service.

More preferably, the preview service information comprises at least one selected from the group consisting of information indicating a presence or non-presence of providing the preview service, preferred preview service information, DVB triplet information of the preview service, preview service access address information, preview service maximum bitrate information, preview service audio attribute information and preview service video attribute information.

Preferably, in the stream transmitting step, the stream of a part displayed in the service provided by dividing a content into at least one or more parts and the stream of at last one buffering-set part are transmitted.

In another aspect of the present invention, a method of receiving broadcast data, receiving a service discovery information packet including information on a service and extracting the information included in the packet, storing the information extracted from the packet and making a channel map using the stored information, and receiving a stream for the service using the channel map.

Preferably, in the stream receiving step, a stream for the service of a display requested channel on a screen is received and displayed and a stream for the service of at least one buffering-set channel is received and buffered. Herein, the buffering-set channel comprises at least one selected from the group consisting of a neighbor channel of the display requested channel, a previously viewed channel, a user-specific viewing reserved channel and a user-preferred channel.

Preferably, in the stream receiving step, a stream of a currently displayed part in a content service provided divided into at least one or more parts is received and displayed on a screen and a stream of at least one buffering-set part is received and buffered.

Preferably, the information on the service includes information on a main service and a preview service of the main service. Herein, in the stream receiving step, the stream for the preview service is received.

More preferably, the method further comprises the step of displaying the received preview service on the screen.

More preferably, the method further comprises the steps of receiving whether the main service of the displayed preview service will be viewed.

More preferably, the method further comprises the step of displaying the received preview service in the course of channel switching.

More preferably, the method further comprises the step of buffering the received preview service.

More preferably, the preview service information comprises at least one selected from the group consisting of information indicating a presence or non-presence of providing the preview service, preferred preview service information, DVB triplet information of the preview service, preview service access address information, preview service maximum bitrate information, preview service audio attribute information and preview service video attribute information.

More preferably, the service discovery information packet includes information on at least one preview service.

More preferably, the stream includes at least one preview service.

In another aspect of the present invention, a broadcast receiver comprises a service discovery manager receiving a service discovery information packet including information on a service, extracting the information included in the packet, a service information database unit storing the information extracted from the packet, a channel manager making a channel map using the stored information, and managing the channel map, and an application/UI manager receiving a stream for the service using the channel map.

Preferably, the application/UI manager receives a stream for the service of a display requested channel, displays the stream on a screen, receives a stream for the service of at least one buffering-set channel, and controls the stream to be buffered.

Preferably, the broadcast receiver further comprises a storage unit receiving and storing the stream for the service of the buffering-set channel.

Preferably, the application/UI manager receives a stream of at least one buffering-set part of a content service divided into at least one part, displays the stream, receives a stream of at least one buffering-set part, and controls the stream to be buffered.

Preferably, the information on the service includes information on main service and information on preview service of the main service. Herein the application/UI manager controls a stream for the preview service to be received using the channel map.

More preferably, the application/UI manager controls the received preview service to be displayed on a screen.

More preferably, the application/UI manager displays the received preview service on a screen in the course of channel switching.

More preferably, the application/UI manager displays the preview service of a selected channel on a screen in advance and controls a presence or non-presence of viewing of the main service of the selected channel to be selected.

Accordingly, the present invention provides the following effects and/or advantages.

First of all, a preview can be provided via information on a service provided by a service provider. And, multichannel buffering can be performed.

Secondly, a user is able to check contents of a service in advance using a preview included in information on a service provided by a service provider.

Thirdly, a time taken to achieve channel switching can be reduced using the provided preview.

Fourthly, a user is able to search channels using the preview before viewing a main service.

Fifthly, a user is able to directly view a broadcast of a specific channel by reducing a time taken to for channel switching by performing multi-channel buffering.

Sixthly, in case that a single content is selectable by a scene unit, a user selects a specific scene from the content and then directly views the selected scene.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram of preview element represented by XML (extensible mark-up language) according to the present invention;

FIGS. 7A to 7C are tables for broadcast discovery record according to the present invention;

FIG. 14 is a table of BCG discovery record according to one preferred embodiment of the present invention;

FIG. 15 is a table of information on preview contents according to one preferred embodiment of the present invention;

FIG. 16 is a table of definitions for preview media types in a table for information on preview contents according to the present invention;

DETAILED DESCRIPTION OF THE INVENTION

Figure 1:
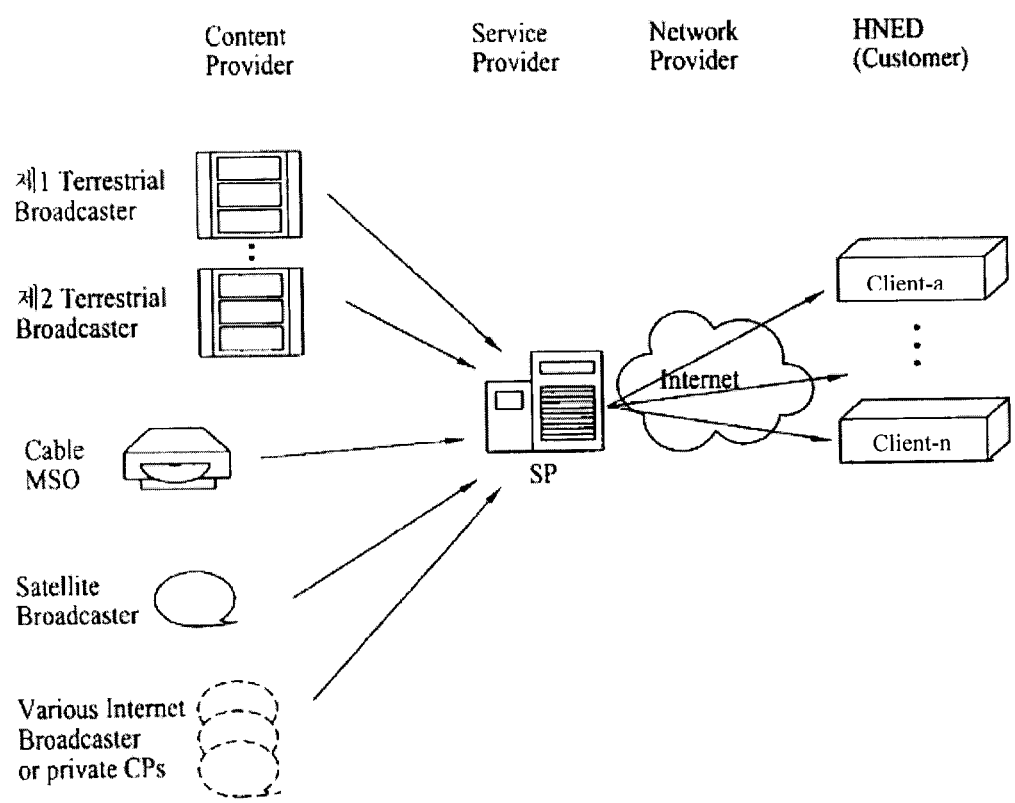
FIG. 1 is a diagram of an IPTV system according to one preferred embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

Moreover, terminologies used currently and widely are selected as terminologies used in this disclosure of the present invention. In some cases, terminologies arbitrarily selected by the applicant are used for the description of the present invention. For this, the accurate or correct meanings are specified in detailed description of the corresponding part. Therefore, it is understood that the arbitrarily selected terminology is not only simply construed as the name of the terminology used in this disclosure but also construed as the meaning of the corresponding terminology.

In the following description, operations of a broadcast receiver, broadcast data transmitting method and broadcast data receiving method according to the present invention are explained in detail with reference to the accompanying drawings.

First of all, IPTV (internet protocol TV) system, which is an example for a system capable of providing various contents using internet network, can mainly include a server, a network and a receiver (client).

The server of the IPTV system can include servers responsible for various functions, such as a service discovery & selection server, a streaming server, a content guide information server, a client information server, a pay information server and the like.

Among the above servers, the streaming server transmits the stored moving picture data encoded by MPEG2 (moving picture experts group 2), MPEG4 and the like to a user via network. For a protocol for the transmission, RTP (real-time transport protocol), RTCP (RTP control protocol) or the like is available.

In case of using RTSP (real-time streaming protocol), moving picture stream playback can be controlled to some extent through a function called a trick play such as pause, replay, stop and the like. The above protocols are just exemplary and other real-time transport protocols are available according to implementations.

The content guide information server is the server that provides information on various contents. In this case, content guide information is the information corresponding to EPG (electronic program guide) information and includes various kinds of information. The content guide information server stores content guide information data and provides the stored data to a receiver.

The service discovery & selection server provides a receiver with connection information on servers providing various content services such as broadcast, COD (contents on demand), game and the like, playback information and the like.

The network system includes an internet based network and gateways. The internet based network can use one of various IP based networks including an optical cable network, a coaxial cable network, FTTH (fiber to the home), a phone network, a wireless network and the like. The gateways can perform multicast group management using such a protocol as IGMP (internet group management protocol), QoS (quality of service) management and the like as well as general data forwarding.

The receiver of the IPTV means the receiver capable of receiving data transported via internet network and then providing the received data to a user. The receiver includes one of IPTV settop, homenet gateway, IPTV embedded TV and the like.

In case of hybrid type IPTV system, various contents of internet can be provided as well as various conventional broadcast contents. In particular, various broadcast contents including terrestrial broadcast, cable broadcast, satellite broadcast, personal broadcast and the like, various internet picture contents, data contents except pictures and the like can be provided to a user. And, these contents can be provided by real time or by on-demand according to a request.

FIG. 1 is a diagram of an IPTV system according to one preferred embodiment of the present invention.

Referring to FIG. 1, in aspect of providing a content service, the IPTV system can include a content provider (CP), a service provider (SP), a network provider (NP) and a user.

The content provider produces various contents to provide. As mentioned in the foregoing description of FIG. 1, the content provider can include one of a terrestrial broadcaster, a cable broadcast service operator (cable system operator (SO) or MSO (multiple system operator)), a satellite broadcaster, an internet broadcaster and the like.

The service provider renders contents provided by the content provider into a service package and then provides the service package. For instance, the service provider shown in FIG. 1 packetizes a first terrestrial broadcast, a second terrestrial broadcast, a cable MSO, a satellite broadcast, various internet broadcasts and the like and then provides the packetized broadcasts to a user.

Figure 2A:
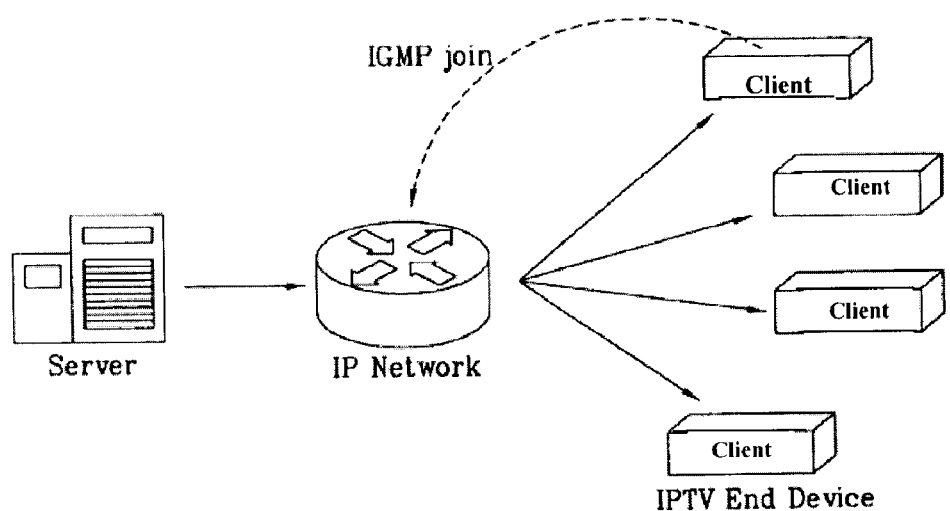
FIG. 2A and FIG. 2B are schematic diagrams of multicast and unicast schemes, respectively.
Figure 2B:
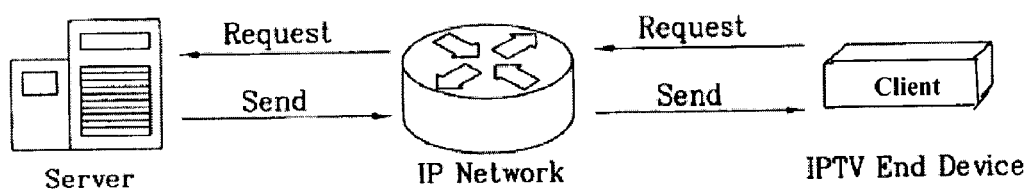

The service provider provides a user with a service using a unicast or multicast scheme. FIG. 2A and FIG. 2B are schematic diagrams for a multicast scheme and a unicast scheme, respectively. In the unicast scheme, data is transported between a single transmitter and a single receiver by 1:1. For instance, in case of the unicast scheme, if a receiver makes a request for data to a server, the server transmits the data to the receiver in response to the request. In the multicast system, data is transmitted to a plurality of receivers of a specific group. For instance, a server is able to transmit data to a plurality of pre-registered receivers at a time. For the multicast registration, IGMP (internet group management protocol) is available.

The network provider provides a network to provide the service to a user. The user can receive the service by establishing a home network (home network end user: HNED) as well.

For a means for protecting a content transported in the IPTV system, conditional access, content protection and the like are available. For example, CableCard, DCAS (downloadable conditional access system) or the like is available for the conditional access or content protection.

Figure 3:
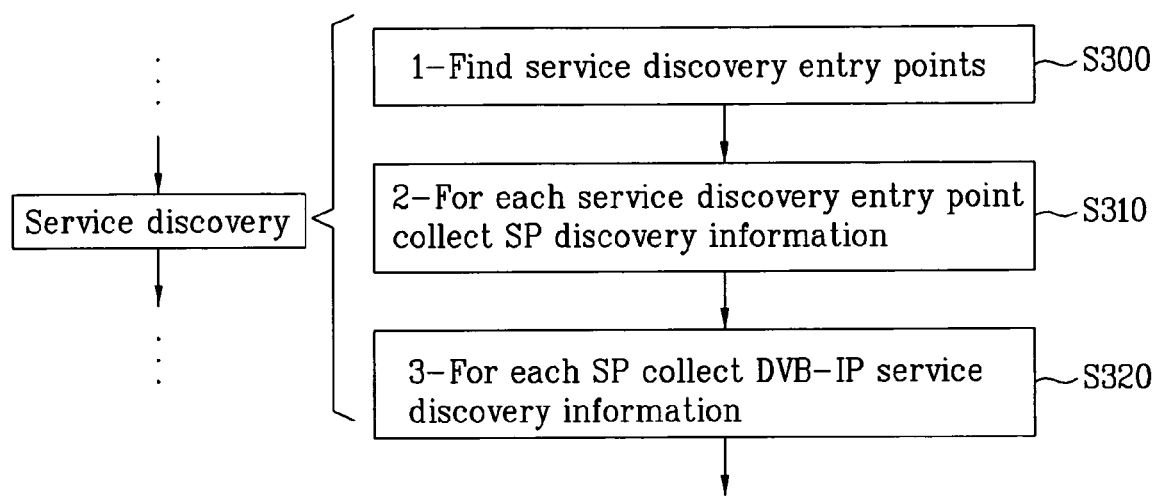
FIG. 3 is a flowchart of a service discovery process.

FIG. 3 is a flowchart of a service discovery process.

Referring to FIG. 3, in order for the IPTV receiver to provide a content to a user, the receiver discover a server storing a user-specific content therein and then accesses the discovered server. To discover the content server, the receiver is able to access an entry point of an IPTV portal (or a system operator (SO)) provided by a network provider [S300]. In this case, the entry point means a sort of an access location.

A user inputs an IP address/port or DNS (domain name system) URL (uniform resource locator) for the entry point of the IPTV portal or selects to input a pre-registered address or the like. Alternatively, the receiver is able to automatically access a pre-selected access or the like.

The entry point of the IPTV portal provides the receiver with a service provider discovery record containing information on each service provider [S310]. In the case, the service provider discovery record contains various kinds of information on a service provider. For instance, the various kinds of information contain service provider identification information, connection information and the like.

The receiver accesses a server of the service provider that provides a user-specific service using the information of the received service provider discovery record. And, the service provider provides the receiver with a service discovery record containing information on a content [S320]. In this case, the service discovery record contains various kinds of information on a content service. In this case, the service discovery record contains an access address of a service server storing the content and the like for example.

The receiver stores the received service discovery record. The receiver accesses the service server of the content provider providing the user-specific content using the information of the service discovery record and then receives a stream from the service server. In case of attempting to view a content provided on a different channel (or, a content provided by a different service server), the receiver accesses the service server of the corresponding content provider again using the information of the stored service discovery record.

If a service server provides a preview service, information on the preview service should be provided to the receiver. In this case, the preview service can include a trailer of a main service, a service constructed with a data size of screen size smaller than that of a main service or the like. Although the information on the preview service can be transmitted to the receiver using a separate record, the present embodiment describes that the information on the preview service is transmitted by being included in a service discovery record about the main service.

Figure 4:
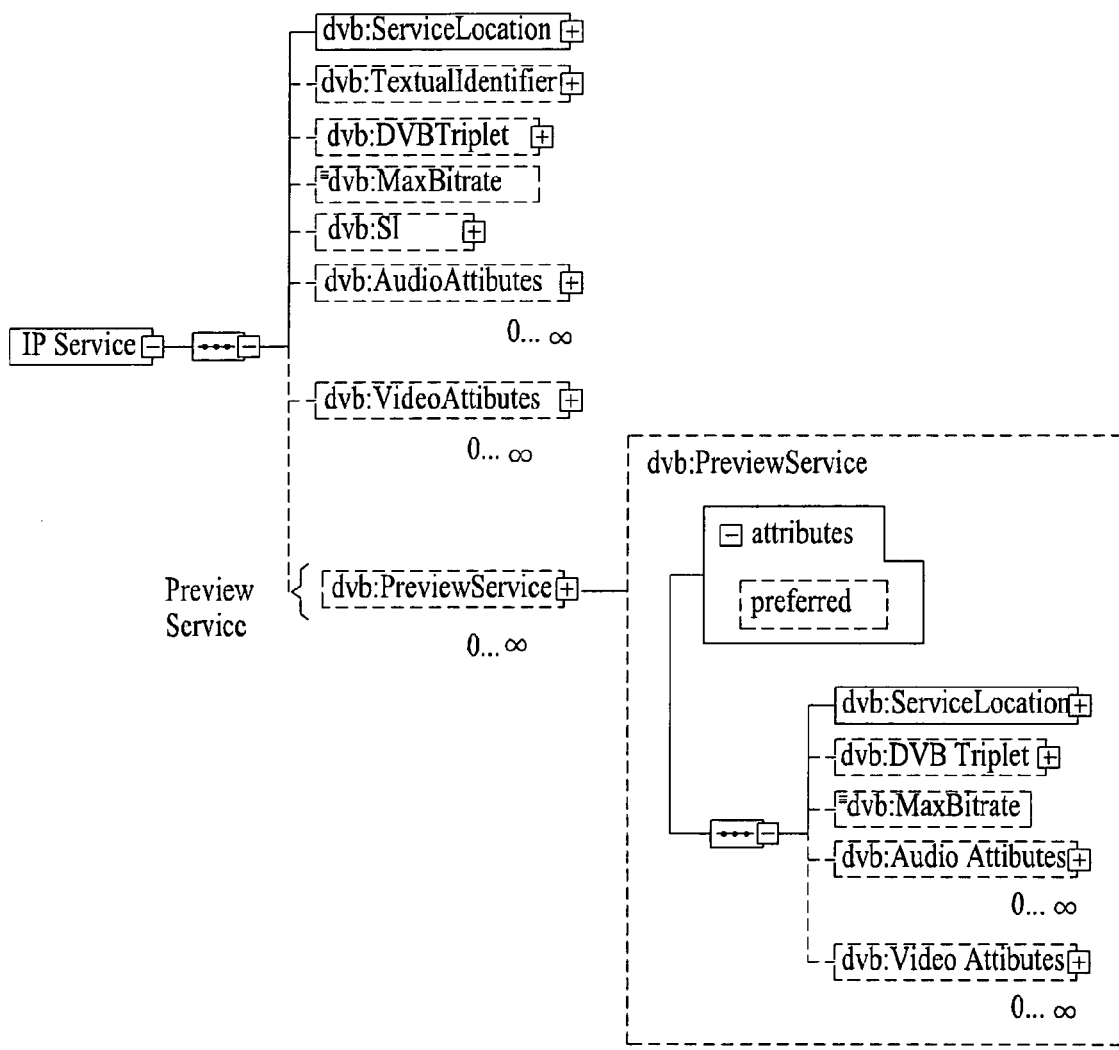
FIG. 4 is a diagram of a structure of broadcast discovery record according to one preferred embodiment of the present invention.

FIG. 4 is a diagram of a structure of a broadcast discovery record according to one preferred embodiment of the present invention.

Referring to FIG. 4, a broadcast discovery record is one of service discovery records provided by a service provider and is the record for carrying information on a live media broadcast service.

In case that a preview service for the live media broadcast service is provided, the information on the preview service can be transmitted by being included in the broadcast discovery record.

For the broadcast discovery record, there are 'TS-Full SI' using DVB SI (service information) included in TS (transport stream) of a sequence and 'TS-Optional SI' not using in-band SI except MPEG (moving picture experts group) PSI (program specific information).

The 'TS-FULL SI' is usable for a case that conventional broadcast data is transported via IP network as it is. Hence, information required for receiving TS is provided to the broadcast discovery record only and information on each service can be obtained from DVB SI included in the TS. The 'TS-Optional SI' is usable for a case that data except in-band SI is transported via IP network. Hence, SI on each service is included in the broadcast discovery record together with location information of a service. The broadcast discovery of the 'TS-Optional SI' is equivalent to that of the 'TS-Full SI'. Yet, the 'TS-Optional SI' differs from the 'TS-Full SI' in a presence or non-presence of SI.

FIG. 4 schematically depicts a structure of a broadcast discovery record and elements included in the record. The element indicated by a solid line is mandatory, while the element indicated by a dotted line is optional. For instance, 'SI' element is optionally included. And, the 'SI' element is included in the broadcast discovery record of 'TS-Optional SI'.

The broadcast discovery record shown in FIG. 4 includes 'ServiceLocation' element containing service location information, 'TextualIdentifier' element containing textual identification information, 'DVBTriplet' element containing triplet information, 'MaxBitrate' element containing maximum bitrate information, 'AudioAttributes' element containing audio attribute information, 'VideoAttributes' element containing video attribute information and 'PreviewService' element containing preview service information. The depicted elements are just exemplary. Necessary elements can be further included and unnecessary elements can be excluded.

Information on a preview service is included in the 'PreviewService' element. The 'PreviewService' element includes 'preferred' attributes containing information about a presence or non-presence of preference, 'ServiceLocation' element containing preview service location information, 'DVBTriplet' element containing triplet information of the preview service, 'MAxBitrate' element containing maximum bitrate information of the preview service, 'AudioAttributes' element containing audio attribute information of the preview service and 'VideoAttributes' element containing video attribute information of the preview service. Likewise, the depicted elements are just exemplary. Necessary elements can be further included and unnecessary elements can be excluded.

Figure 5:
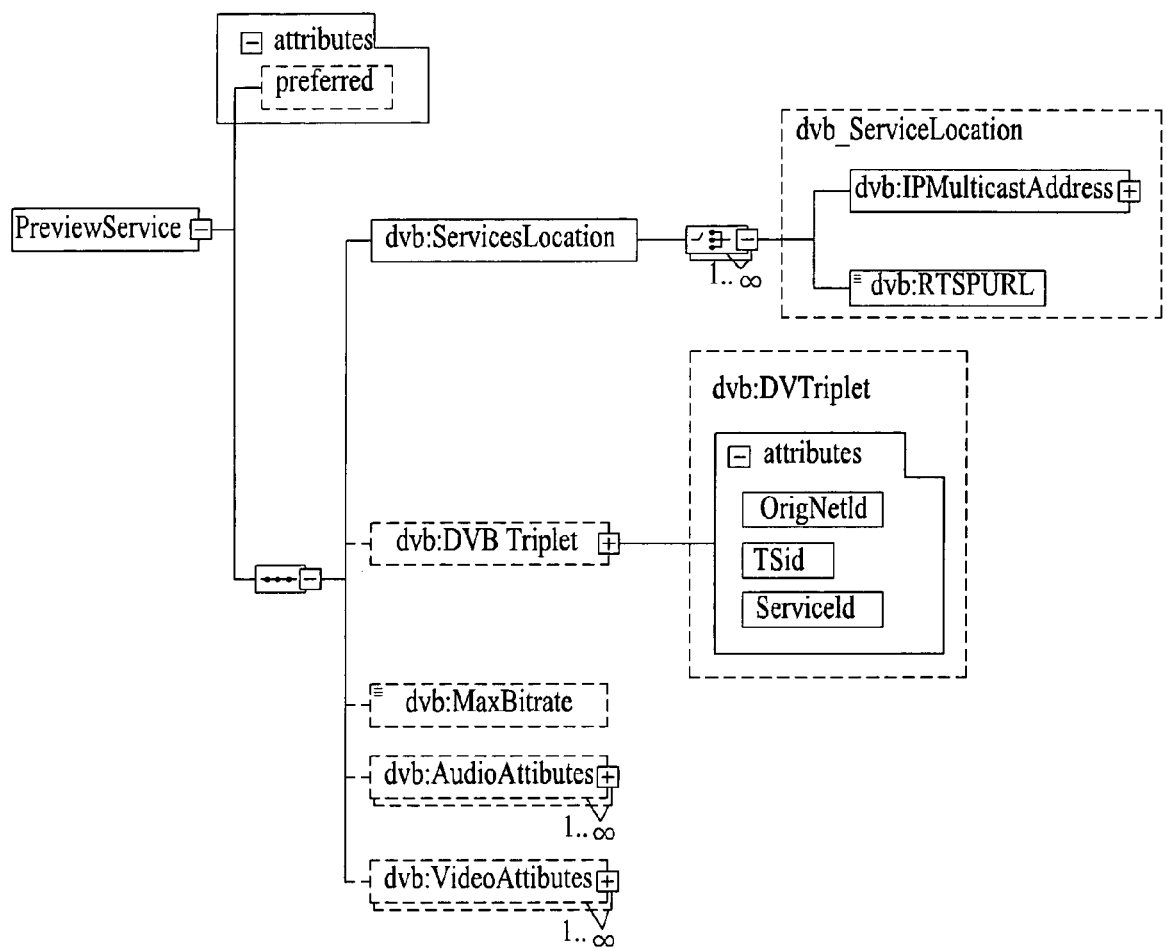
FIG. 5 is a diagram of a structure of preview service element according to one preferred embodiment of the present invention.

FIG. 5 is a diagram of a structure of preview service element according to one preferred embodiment of the present invention.

Referring to FIG. 5, a preview service element includes 'preferred' element, 'ServiceLocation' element, 'DVBTriplet' element, 'MAxBitrate' element, 'AudioAttributes' element and 'VideoAttributes' element.

The 'ServiceLocation' element includes 'IPMulticastAddress' element containing multicast address information and 'RTSPURL' element containing address information for providing a service according to RTSP (real-time streaming protocol). In case that 'DVBTriplet' element is included, the element includes 'OrigNetId' element containing network ID (identifier) information, 'TSId' element containing TS (transport stream) ID information and 'ServiceId' element containing ID information for identity discriminated from another service included in TS.

FIG. 6 is a diagram of preview element represented by XML (extensible mark-up language) according to the present invention.

Referring to FIG. 6, it can be observed that information on the elements described with reference to FIG. 4 is shown in FIG. 6. In the information, 'minOccurs' means a minimum occurrence frequency and 'maxOccurs' means a maximum occurrence frequency. If the maximum occurrence frequency is 'unbounded', there is no limitation put on the occurrence frequency.

FIGS. 7A to 7C are tables for broadcast discovery record according to the present invention.

A single recorded is depicted through FIGS. 7A to 7C that are divided to consider a size of the drawing. A broadcast discovery record shown in FIGS. 7A to 7C describes the details of the respective elements according to the structure shown in FIG. 4. Unlike the record shown in FIG. 4, the broadcast discovery record shown in FIGS. 7A to 7C further includes an element about forward error correction (FEC) and an element about service availability but does not include SI element therein. In case of 'TS-Optional SI', the SI element can be further included.

Broadcast providing type of FIGS. 7A to 7C is 'Broadcast-Discovery' and service list information is included in 'BraodcastDiscovery/ServiceList'.

If identification information of BCG record about BCG (broadband content guide) discovery exists, 'ServiceDescriptionLocation' includes the identification information. And, 'preferred' includes location information of a preferred BCG. In this case, the BCG means content guide information corresponding to EPG (electronic program guide).

Various kinds of information on a service are included in 'braodcastDiscovery/ServiceList/SingleService'.

'TextualIdentifier@DomainName' includes internet DNS domain name information for identifying a service provider, and 'TextualIdentifier@ServiceName' includes host name information of a service provided by a service provider.

'DVBTriplet' includes DVB Triplet information on a service. In the 'DVBTriplet', 'DVBTriplet@OrigNetId' includes original_network_id information, 'DVBTriplet@TSId' includes transport_stream_id information, and 'DVBTriplet@ServiceId' includes service_id information. Moreover, 'MaxBitrate' includes maximum bitrate information of a stream carrying a service.

Information on a location of a service is included in 'BroadcastDiscovery/ServiceList/SingleService/ServiceLocation'. And, at least one IPMulticastAddress information or RTSPURL information should be included in the below.

'IPMuliticastAddress@Source', 'IPMuliticastAddress@Address' and 'IPMuliticastAddress@Port' include information indicates a use of IGMP (internet group management protocol) for accessing the service and includes information of service-accessible URL and port. 'IPMulticastAddress@Streaming' optionally includes information indicating whether streaming is by RTP or direct UDP (user datagram protocol).

'RTSPURL' indicates a use of RTSP (Real-Time Streaming Protocol) to access a service and includes information on URL accessible to the service.

'FECBaseLayer@Address' and 'FECBaseLayer@Port' includes information on an IP multicast address, at which information of FEC (Forward Error Correcting) Base Layer (SMPTE-2002-1) is located, and a UDP port, respectively. Likewise, 'FECEnhancementLayer@Address' and 'FECEnhancementLayer@Port' includes information on an IP multicast address, at which information of FEC (Forward Error Correcting) Enhancement Layer (Raptor) is located, and a UDP port, respectively.

'FECMaxBlockSizePackets' includes information on a maximum block number of source packet transmitted from a first packet block to a last packet block, and 'FECMaxBlockSizeTime' includes information on a maximum transport time of FECC packet block. 'FECObjectTransmissionInformation' includes transport information of an FEC object for Raptor code.

'AudioAttributes' includes information on audio coding algorithm to be used for the service and purpose, 'VideoAttributes' includes detailed information on video coding to be used for the service.

Information on a preview service is included in 'PreviewService', '@preferred', 'DVBTriplet@OrigNetId', 'DVBTriplet@TSId', 'DVBTriplet@ServiceId', 'IPMuliticastAddress@Source', 'IPMuliticastAddress@Address', 'IPMuliticastAddress@Port', 'RTSPURL', 'MaxBitrate', 'AudioAttributes' and 'VideoAttributes'.

'PreviewService' includes information indicating whether the preview service of the service is provided. At least one preview service for the main service can be provided. Hence, '@preferred' includes information indicating that it is a preferred one of the at least one or more preview services.

In case that a service is provided based on TS, several preview services can be carried by a single TS. In particular, if multiple preview services are provided using MPTS (multi program transport stream), it is necessary to discriminate the respective preview services included in the TS. For the multi-preview service discrimination, DVB triplet information is available.

'DVBTriplet' includes DVB Triplet information on a preview service. In the 'DVBTriplet', 'DVBTriplet@OrigNetId' includes network ID information, 'DVBTriplet@TSId' includes TS ID information, and 'DVBTriplet@ServiceId' includes service ID information. Using the network ID information, the TS ID information and the service ID information, it is able to discriminate the respective preview services included in the TS. If a single preview service is carried by a single TS, the DVB triplet information may not be included in a record.

Information on a location of a preview service is included in 'BroadcastDiscovery/ServiceList/SingleService/PreviewService/ServiceLocation'.

'IPMuliticastAddress@Source', 'IPMuliticastAddress@Address' and 'IPMuliticastAddress@Port' indicate a use of IGMP (Internet Group Management Protocol) to access the preview service and include information on a URL and port accessible to the preview service. 'IPMulticastAddress@Streaming' optionally includes information indicating whether it is a streaming by RTP or a streaming by direct UDP (User Datagram Protocol).

'RTSPURL' indicates a use of RTSP (real-time streaming protocol) to access a preview service and includes information on a URL accessible to the service. 'MAxBitrate' includes maximum bitrate information of a stream carrying a service.

'AudioAttributes' includes information on audio coding algorithm to be used for the preview service and purpose. And, 'VideoAttributes' includes information on video coding to be used for a preview service.

'ServiceAvailability' provides a list about a cell (or region) related to a main service. By default, all the single services are available everywhere. 'CountryCode' includes information on a country for which the availability is defined. '@Availability' includes information indicating whether the service is available in a country specified by the 'CountryCode'. 'Cells' include information representing a geographical region specified by the 'CountryCode'.

In FIGS. 7A to 7C, 'M' in a most right column is a mark indicating a mandated element and 'O' in the most right column is a mark indicating an optionally included element.

The receiver receives the service discovery record shown in FIGS. 7A to 7C and it then able to obtain information on a preview service.

Figure 8:
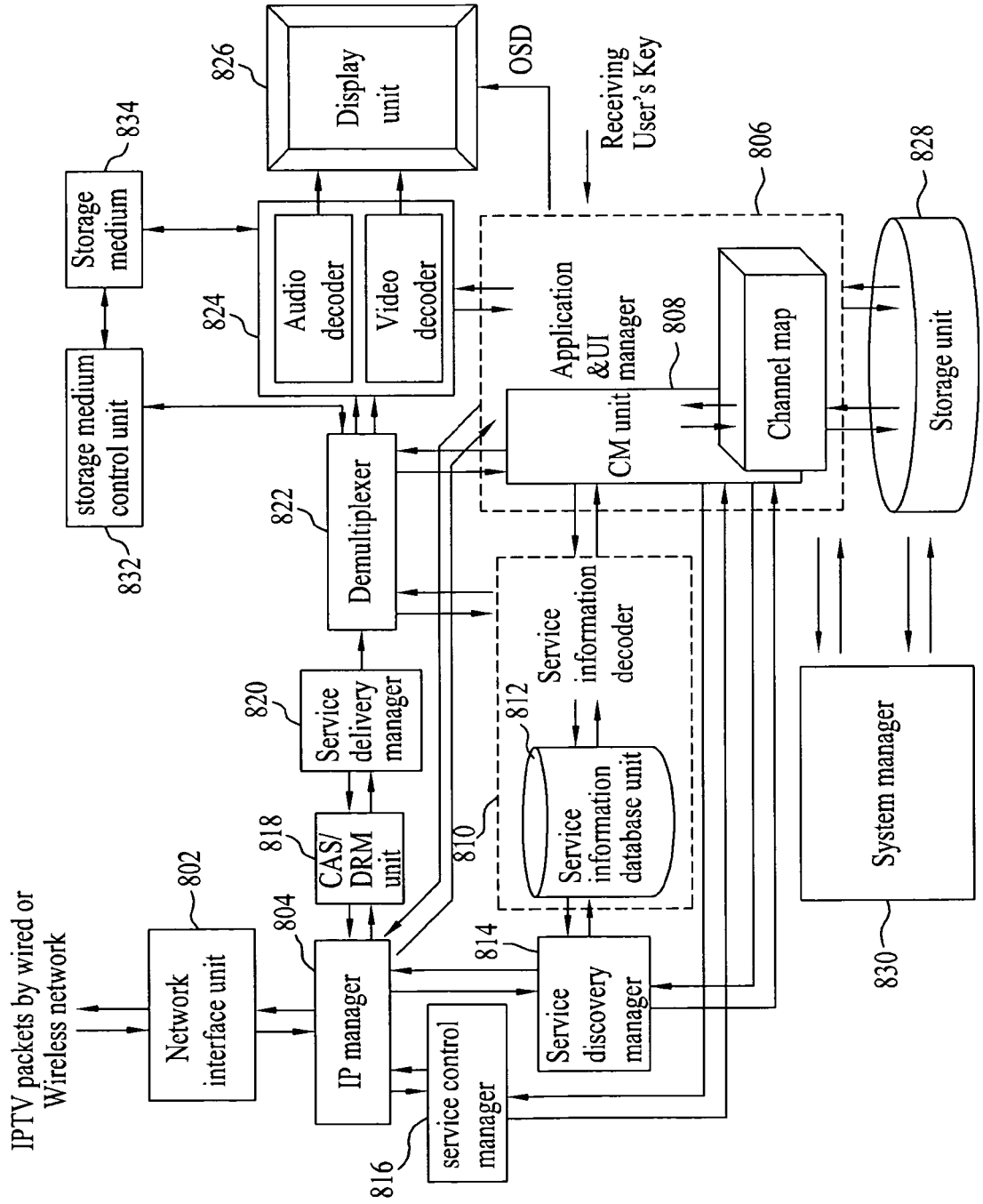
FIG. 8 is a block diagram of a broadcast receiver according to one preferred embodiment of the present invention.

FIG. 8 is a block diagram of a broadcast receiver according to one preferred embodiment of the present invention.

Referring to FIG. 8, a receiver is able to include a separate tuner for receiving terrestrial broadcast, cable broadcast, satellite broadcast and/or the like. For clarity and convenience of the description of the present invention, parts for processing a content transported via internet are mainly explained in the following description.

The receiver includes a network interface unit 802, an IP manager 804, an application/UI manager 806, a CM unit 808, a service information decoder 810, a service information database unit 812, a service discovery manager 814, a service control manager 816, a CAS/DRM unit 818, a service delivery manager 820, a demultiplexer 822, an audio/video decoder 824, a display unit 826, a storage unit 828, a system manager 830, a storage medium control unit 832 and a storage medium 834.

The network interface unit 802 receives packets received from a network and transmits packets to the network from the receiver. The IP manager 804 manages packet delivery to a destination from a source for the packets received or transmitted by the receiver. And, the IP manager 804 sorts the received packet to correspond to a suitable protocol.

The application/UI (user interface) manager 806 provides GUI (graphic user interface) for a user using OSD (on screen display) or the like. The application/UI manager 806 receives a key input from a user and then performs a receiver operation according to the input. For instance, if a key input for a channel selection is received from a user, the application/UI manager transports the key input signal to the CM unit 808.

The CM (channel manager) unit 808 prepares a channel map. The CM unit 808 selects a channel according to the key input received from the application/UI manager 806 using the channel map and controls the service discovery manager 814 and the service control manager 816. The CM unit 808 receives service information of a channel from the service information decoder 810 and then sets an audio/video PID (packet identifier) of the selected channel for the demultiplexer 822.

The service information decoder 810 decodes such service information as PSI (program specific information). In particular, the service information decoder 810 receives a PSI section demultiplexed by the demultiplexer 822, a PSIP (program and service information protocol) section, a DVB-SI (service information) section and the like and then decodes the received sections.

The service information decoder 810 establishes a database for service information by decoding the received sections. And, the database for the service information is stored in the service information database unit 812.

The service discovery manager 814 provides information required for selecting a service provider that provides a service. In case of receiving a signal for a channel selection from the application/UI manager 806, the service discovery manager 814 discovers a service using the information.

The service control manager 816 is responsible for a selection and control of service. For instance, if a user selects a live broadcasting service as good as a conventional broadcasting system, the service control manager 816 performs the selection and control of service using IGMP, RTSP or the like. If a user selects such as service as VOD (video on demand), the service control manager 816 performs the selection and control of service using RTSP. The RTSP is able to provide a trick mode for real-time streaming. The protocol is just exemplary and other protocols are available according to implementation examples.

The packet for the service, which is received via the network interface unit 802 and the IP manager 804, is transported to the CAS/DRM unit 818. The CAS/DRM unit 818 is responsible for a conditional access system (CAS) of service and digital rights management (DRM).

The service delivery manager 820 is responsible for a control of service data. For instance, in case of controlling real-time streaming data, it is able to use RTP/RTCP (real-time transport protocol/RTP control protocol). In case that the real-time streaming data is transported using RTP, the service delivery manager 820 parses the received data packet according to the RTP and then transports the parsed packet to the demultiplexer 822. The service delivery manager 820 feeds back the network reception information to a server side that provides a service.

The demultiplexer 822 demultiplexes the received packet into audio, video, PSI (program specific information) data and the like and then transports the demultiplexed data to the video/audio decoder 824 and the service information decoder 810.

The video/audio decoder 824 decodes the video and audio data received from the demultiplexer 822. The video data decoded by the video/audio decoder 824 is provided to a user via the display unit 826. And, the decoded audio data is provided to the user via a speaker (not shown in the drawing).

The storage unit 828 stores setup data and the like for the system. The storage unit 828 can include a non-volatile RAM (NVRAM), a flash memory and the like. And, the system manager 830 controls overall operations of the receiver system through power.

The storage medium control unit 832 controls video/audio data to be stored in the storage medium 834 or controls the data stored in the storage medium 834 to be read and played back. The storage medium 834 receives the video/audio data from the video/audio decoder 824 and then stores the received video/audio data under the control of the storage medium control unit 832.

The receiver accesses an entry point of an IPTV portal and then receives a packet of a service provider discovery record. The network interface unit 802 transports the received packet to the IP manager 804. The IP manager 804 checks whether a destination of the received packet is the receiver or not and then transports the packet to a suitable manager block according to a transmission/reception protocol.

Packet containing the service provider discovery information is transported using the protocol relevant to a service discovery and selection. For instance, in case of DVB-IP, the packet is transported according to SD&S (service discovery & selection) protocol (or, service discovery protocol: SDP). Therefore, the IP manager 804 transports the packet containing the service provider discovery information to the service discovery manager 814.

The service discovery manager 814 parses the received packet and then obtains various kinds information of the service provider discovery record. The service discovery manager 814 transports the information to the service information database unit 812. The information is then stored in the service information database unit 812.

The receiver is able to receive the packet containing service discovery information from a service provider using connection information of the service provider contained in the service provider discovery record. The packet containing the service discovery information is transported/received using SD&S protocol (or, SDP).

The service discovery record includes a broadcast discovery record, a CoD (content on demand) discovery record, a package discovery record, a BCG discovery record and the like. Assume that the broadcast discovery record containing information of preview service, as mentioned in the foregoing description with reference to FIGS. 7A to 7C, in the service discovery record is received.

The packet containing the broadcast discovery information is transported to the IP manager 802 via the network interface unit 802. The IP manager 804 checks whether the destination of the received packet is the receiver and then transports the packet to the service discovery manager 814. The service discovery manager 814 obtains broadcast discovery information from the received packet. The service discovery manager 814 transports the information to the service information database unit 812. Hence, the information is stored in the service information database unit 812.

The service information database unit 812 stores and manages various kinds of the received information. The CM unit 808 makes and manages a channel map using various kinds of information stored in the service information database unit 812.

The application/UI manager 806 receives channel information corresponding to a specific content from a user and then controls a channel to be switched according to the channel map. In particular, the application/UI manager 806 receives the channel information corresponding to the user-specific content and is then able to switch a channel.

In case that the above-described broadcast discovery record containing the information on the preview service is received, the receiver stores the information in the service information database unit 812 and then makes and manages a channel map.

The receiver accesses an address, at which a main service is stored, and an address, at which a preview service is stored, and is then able to be provided with the main service and the preview service. Yet, in case that a plurality of preview services exist in the single main service, it is able to select a preferred preview service according to 'preferred' attributes. Alternatively, it is able to select a suitable preview service by considering resolution or video attributes according to options of the receiver. Alternatively, a user selects the preview service in direct. Alternatively, a user presets a condition and then selects a corresponding preview service.

The packet containing data of the selected main service and data of the selected preview service is transported to the demultiplexer 822 via the IP manager 804, the CAS/DRM unit 818 and the service delivery manager 820.

The CM unit 808 demultiplexes the packet containing the main service data and the preview service data by controlling the demultiplexer 822 under the control of the application/UI manager 806. The CM unit 808 controls the demultiplexing using PID (packet ID), an access address or the like. If at least one preview service included in a single TS is received MPTS, the preview service included in the TS is identified using DVB triplet information.

The demultiplexed service data is decoded by the audio/video decoder 824 and is then displayed on the display unit 826. The demultiplexed service data is stored in the storage medium 834 under the control of the storage medium control unit 832.

The preview service can be displayed on the screen together with the main service or can be displayed separate from the main service on the screen. For instance, while the main service is displayed on a main screen, at least one preview service on a different channel can be displayed on the screen using PIP or screen partition.

By displaying a preview service on a content guide image such as EPG and BCG together with service information, a user is enabled to obtain service selection information sufficiently.

As mentioned in the above description, a preview service can be displayed on a screen or a quick channel search and switching can be performed using the preview service. For instance, in case that a channel is switched in the course of viewing a service on a specific channel, the receiver should access an address at which a service on a switched channel is stored.

In case that the above channel switching takes place, the application/UI manager 806 accesses an address, at which a preview service is stored, as well as an address at which a main service of the switched channel is stored. If the preview service is inferior to the main service in resolution, bitrate and the like, the preview service may be received by the receiver ahead of the main service. Hence, the receiver should display the preview service received ahead of the main service on the screen before the main service is received and displayed on the screen. Yet, according to network configurations, the main service may be received ahead of the preview service. If so, the main service received ahead of the preview service is displayed on the screen.

Alternatively, in case that the above channel switching takes place, the application/UI manager 806 accesses an address, at which a preview service is stored, as well as an address at which a main service of the switched channel is stored. By displaying the preview service on the screen in the first place, the application/UI manager receives an input indicating whether a user will view the service. In particular, the application/UI manager 806 enable a user to determines whether to view the main service after viewing the preview service in the first place or to perform a channel switching to a different channel. In this case, a user is made to perform a quicker channel search using a preview service that takes a less time to be received.

In case of using service buffering, the delay time can be further reduced. In particular, it is able to reduce the time taken to access an address, at which a service is stored, by buffering a main service or a preview service.

For instance, it is able to buffer data by accessing a main service address of a user preferred channel, a neighbor channel of a current viewing channel, a previous viewing channel, a user setup channel or the like in advance. In this case, if a channel is switched to a buffering set channel, it is able to directly view a buffered channel.

Alternatively, it is able to buffer the preview service. Data is buffered by accessing a preview service address of a user preferred channel, a neighbor channel of a current viewing channel, a previous viewing channel, a user setup channel or the like in advance. And, the buffered data can be directly used for the above-described channel switching or channel search.

In case of using buffering, PID of a packet containing a service to be buffered is set in the demultiplexer 822 under the control of the CM unit 808. The service is buffered and stored in the storage medium 834. Alternatively, a separate buffer memory can be provided for buffering. Alternatively, buffering can be performed using a transport address of a service.

Figure 9:
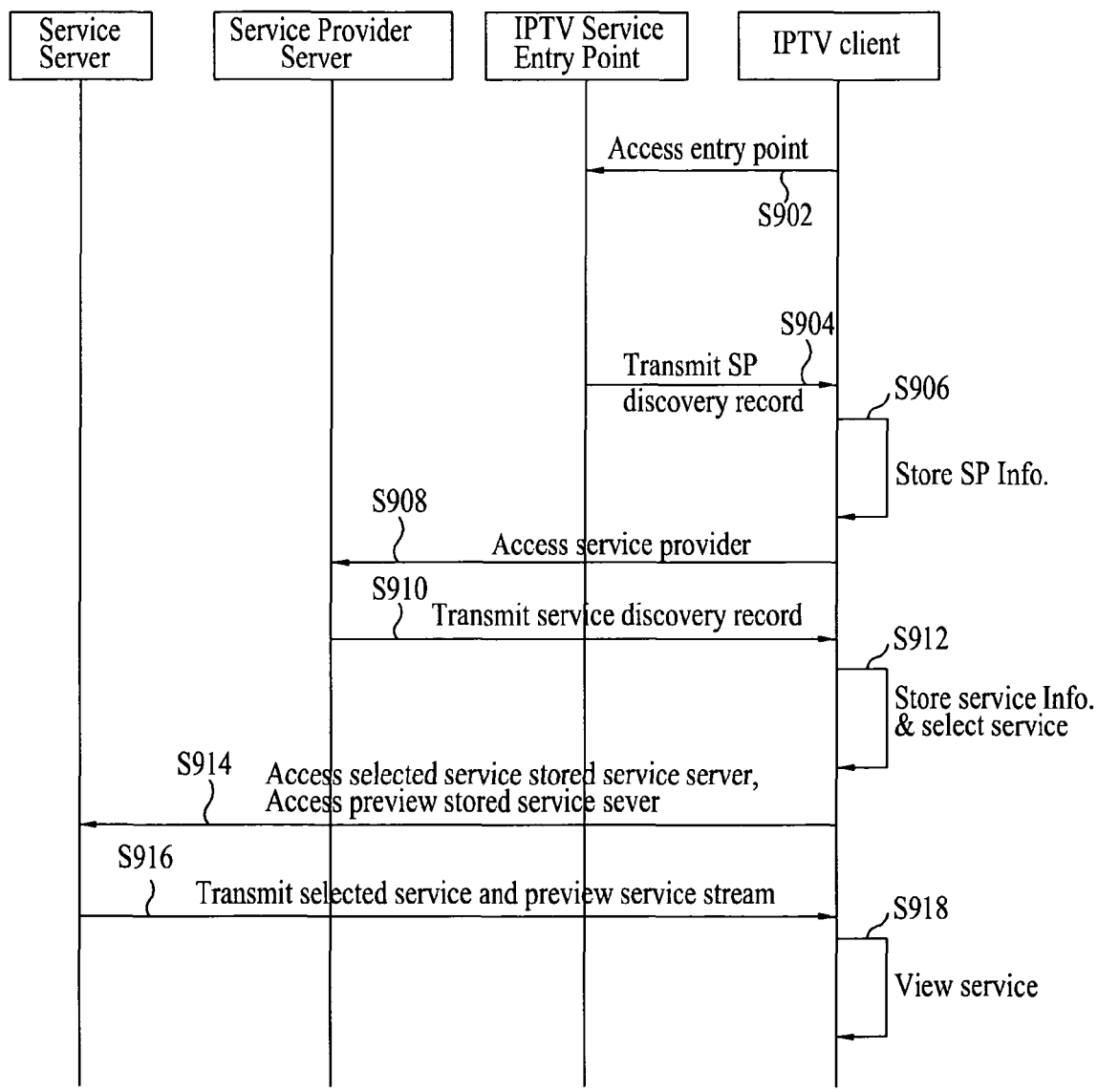
FIG. 9 is a flowchart of a signal processing process according to one preferred embodiment of the present invention.

FIG. 9 is a flowchart of a signal processing process according to one preferred embodiment of the present invention.

FIG. 9 shows a flow and sequence of signals between a service server and a service provider server and between an entry point of an IPTV portal and a receiver. In this case, the service server means a service server in which contents are stored.

Referring to FIG. 9, a receiver accesses an entry point of IPTV portal provided by a network provider [S902]. The IPTV portal is able to check subscription information of the accessed receiver. In particular, by checking the subscription information or the like, it is able to check whether the receiver is the receiver capable of being provided with a service linked with the IPTV portal.

The entry point of the IPTV portal transports a service provider discovery record including various kinds of informations on the network provider or a service provider to the receiver [S904].

The receiver stores various kinds of informations included in the received service provider discovery record [S906]. In this case, the informations can include service provider identification information, service provider connection information and the like.

The receiver accesses a server of the service provider using the connection information on the service provider among the informations [S908]. If there is an access by the receiver, the server of the service provider transports a service discovery record including various kinds of informations on a service to the receiver [S910].

The receiver receives the service discovery record and then stores the various informations included in the record [S912]. In this case, the informations can include content provider identification information, content source identification information, content substance identification information, characteristic information of content data, connection information of service and the like. In case that a preview service for the service is provided, informations on the preview service can be included. The receiver makes a channel map using the informations.

The receiver accesses a service server, in which the corresponding service is stored, using the channel map [S914]. The service means a main or preview service of the corresponding channel. The receiver may access the server storing the main service only or may access the server storing the preview service only.

The service server initiates a streaming service by transporting a data stream of the stored service to the accessed receiver [S916]. The receiver displays both of the main and preview services received from the service server on a screen or displays the main service and the preview service separately on the screen using EPG, BCG or the like [S918]. Alternatively, the preview service is displayed on the screen for a channel switching or channel search.

Figure 10A:
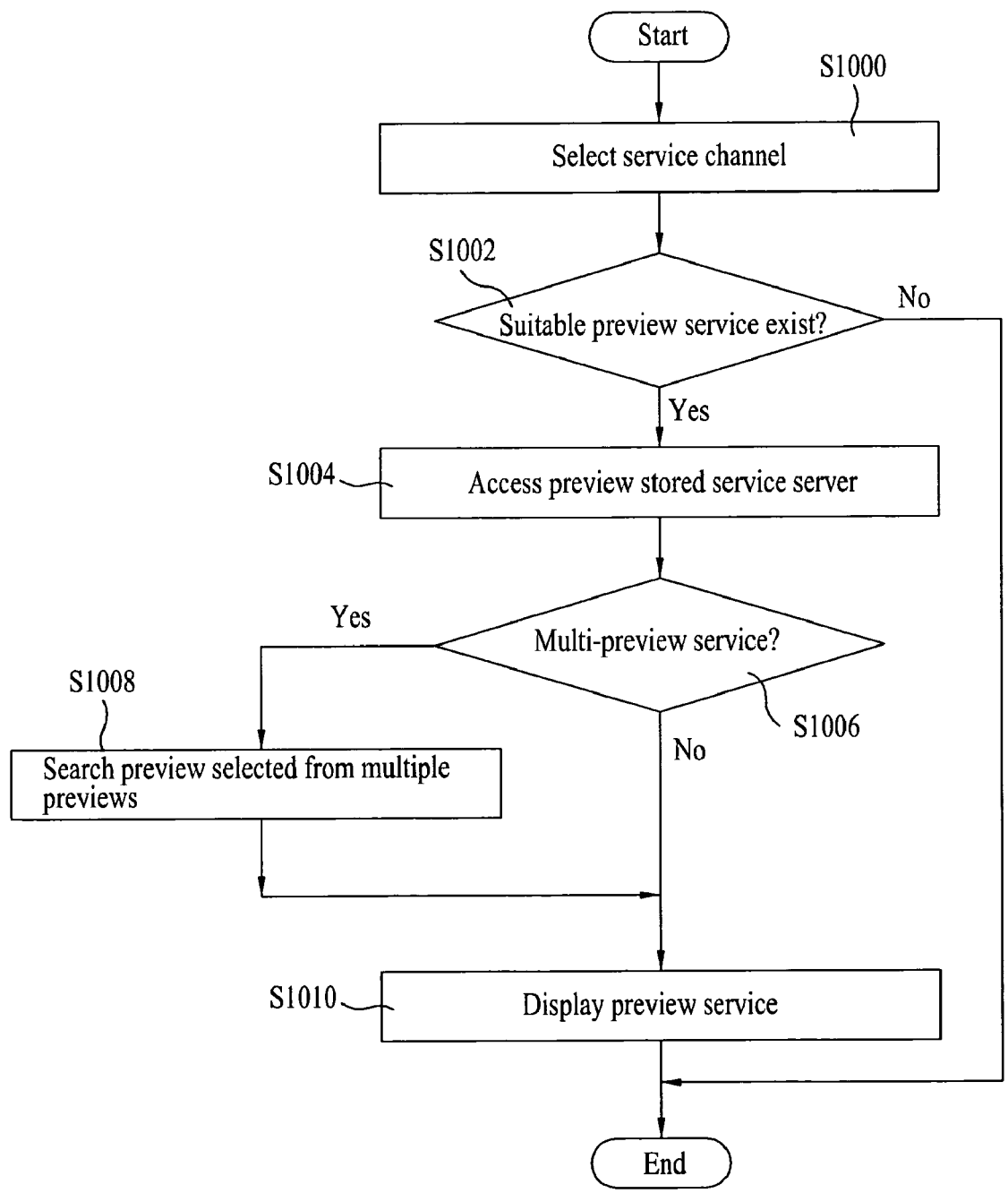
FIGS. 10A to 10C are flowcharts for a method of processing a preview service according to one preferred embodiment of the present invention.
Figure 10B:
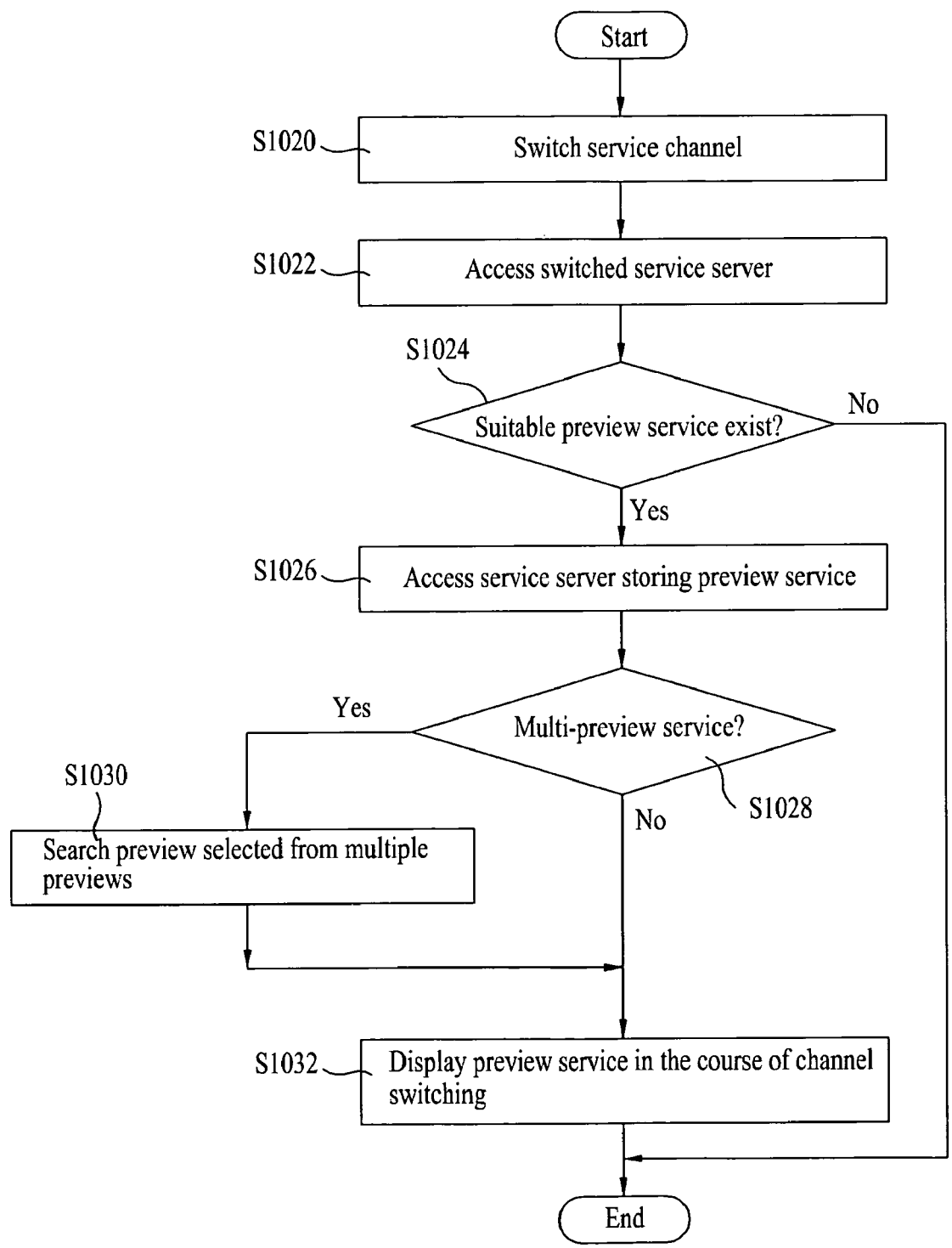
Figure 10C:
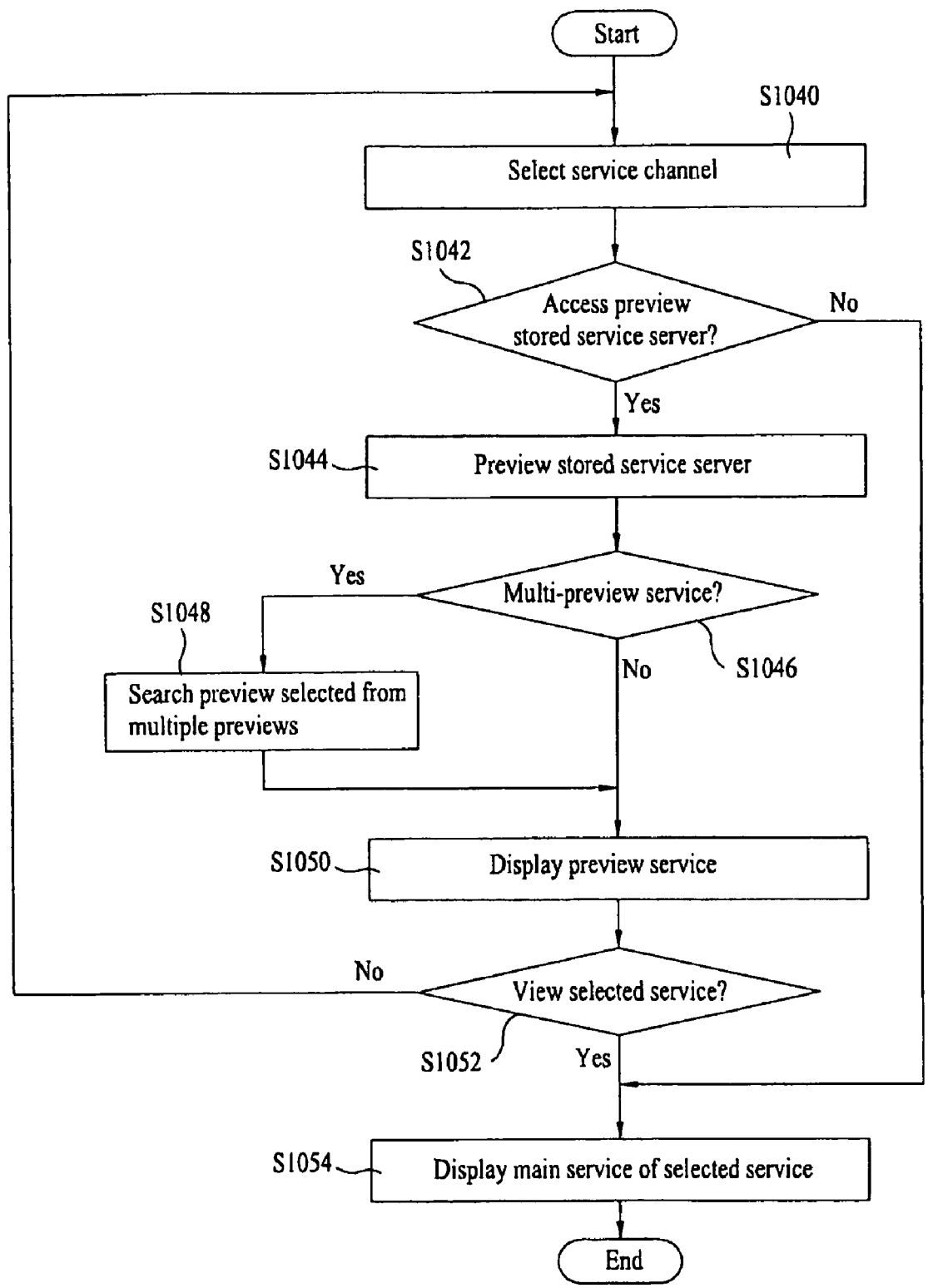

FIGS. 10A to 10C are flowcharts for a method of processing a preview service according to one preferred embodiment of the present invention.

FIG. 10A shows a method of receiving and processing a preview service in a receiver.

Referring to FIG. 10A, a channel for providing a specific service is selected using such a content guide as EPG and BCG according to a request made by a user [S1000]. If the channel is selected, it is decided whether a preview service provided by the channel exists and whether a preview service suitable for receiver options exists [S1002]. Whether the preview service is suitable can be decided using video attributes or audio attributes.

As a result of the deciding step S1002, if the suitable preview service exists, a service server storing the preview service therein is accessed [S1004]. An address of the service server can be received in advance using the above-described service discovery record or the like. As a result of the deciding step S1002, if the suitable preview service does not exist, the preview service is not displayed on the screen.

The receiver accesses the service server and then receives a preview service. The receiver decides whether the received preview service corresponds to a multi-preview service that is received in a manner that at least one preview services are included in a single stream [S1006]. For instance, several preview services can be received by being included in a single transport stream (TS).

As a result of the decision made in the step S1006, if it is the multi-preview service, the preview services are searched for a preview service of the selected channel [S1008]. The preview service of the selected channel can be discovered using a sort of identification information such as DVB triplet. If the preview service of the selected channel is discovered, the preview service is displayed on the screen [S1010].

As a result of the decision made in the step S1006, if it is not the multi-preview service, a single preview service is received. Therefore, the received single preview service is displayed on the screen [S1010].

FIG. 10B is a flowchart of another method of processing a preview service according to one embodiment of the present invention. FIG. 10B shows a process for receiving and displaying a preview service on a screen in the course of channel switching in a receiver.

Referring to FIG. 10B, a channel of a specific service to be viewed is switched by a request made by a user or the like [S1020]. The receiver accesses a service server of a switched channel using service discovery information or the like [S1022].

The receiver decides whether a preview service provided by the switched channel exists and whether a preview service suitable for receiver options exists [S1024]. Whether the preview service is suitable can be decided using video attributes or audio attributes.

As a result of the deciding step S1024, if the suitable preview service exists, a service server storing the preview service therein is accessed [S1026]. An address of the service server can be received in advance using the above-described service discovery record or the like. In this example, for clarity and convenience of the description, there are the step of accessing the service server of the switched channel and the step of accessing the preview service server of the switched channel. Optionally, the receiver is able to process both of the access steps simultaneously.

As a result of the deciding step S1024, if the suitable preview service does not exist, the preview service is not displayed on the screen. The receiver waits until a main service of the switched channel is received. If the main service is received, the receiver displays the received main service on the screen.

The receiver accesses the service server and then receives a preview service. The receiver decides whether the received preview service corresponds to a multi-preview service [S1028]

As a result of the decision made in the step S1028, if it is the multi-preview service, a preview service of the selected channel is discovered from the preview services [S1030]. The preview service of the selected channel can be discovered using a sort of identification information such as DVB triplet. If the preview service of the selected channel is discovered, the preview service is displayed on the screen until a main service of the switched channel is received and displayed on the screen [S1032].

As a result of the decision made in the step S1028, if it is not the multi-preview service, a single preview service is received. Therefore, the received single preview service is displayed on the screen until a main service of the switched channel is received and displayed on the screen [S1032].

FIG. 10C is a flowchart of another method of processing a preview service according to one embodiment of the present invention. FIG. 10C shows a process for searching channels using a preview service in a receiver.

Referring to FIG. 10C, a channel is switched according to a user's request or a channel providing a specific service is selected using a content guide such as EPG and BCG

[S1040]. If the channel is switched or selected, it is decided whether a preview service provided by the channel exists and whether a preview service suitable for receiver options exists [S1042]. Whether the preview service is suitable can be decided using video attributes or audio attributes.

As a result of the deciding step S1042, if the suitable preview service exists, a service server storing the preview service therein is accessed [S1044]. An address of the service server can be received in advance using the above-described service discovery record or the like. As a result of the deciding step S1042, if the suitable preview service does not exist, the preview service is not displayed on the screen but a main service of the switched or selected channel is directly displayed on the screen.

The receiver accesses the service server and then receives a preview service. The receiver decides whether the received preview service corresponds to a multi-preview service that is received in a manner that at least one preview services are included in a single stream [S1046].

As a result of the decision made in the step S1046, if it is the multi-preview service, the preview services are searched for a preview service of the selected channel [S1048]. The preview service of the selected channel can be discovered using a sort of identification information such as DVB triplet. If the preview service of the selected channel is discovered, the preview service is displayed on the screen [S1050].

As a result of the decision made in the step S1046, if it is not the multi-preview service, a single preview service is received. Therefore, the received single preview service is displayed on the screen [S1050].

A user inputs whether to view the main service of the channel using the preview service displayed on the screen [S1052]. If a command for viewing the main service of the main channel is inputted, the main service of the selected channel is displayed on the screen pS1054]. Yet, if the main service of the selected channel is not to be viewed, it is able to select or switch a service channel again [S1040].

Meanwhile, the receiver shown in FIG. 8 buffers at least one channel as well as a viewing channel a user attempts to view or buffers at least one scene part. And, the buffering channel can be set via menu.

Figure 11A:
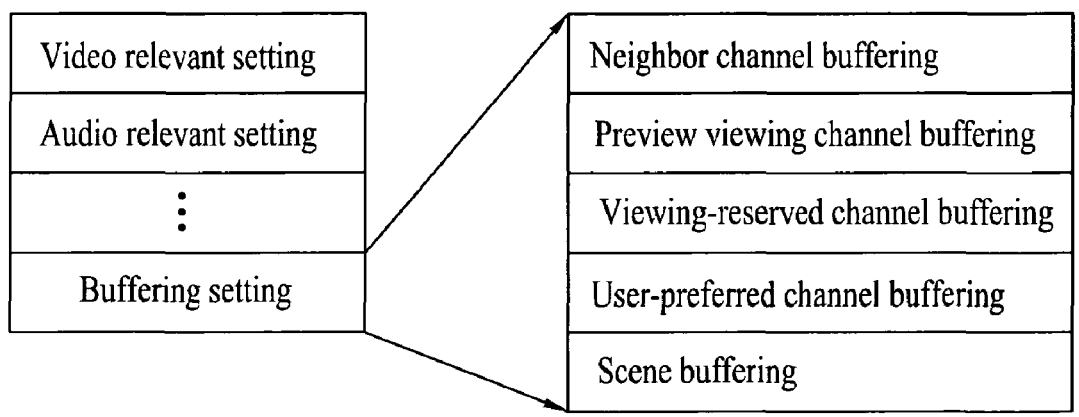
FIG. 11A is a schematic diagram of a menu for setting a buffering channel according to one preferred embodiment of the present invention.

FIG. 11A is a schematic diagram of a menu for setting a buffering channel according to one preferred embodiment of the present invention.

Referring to FIG. 11A, if a user request is inputted via an input device such as a remote controller, a keypad, a jog dial, a touchscreen provided to a screen and the like, a setting menu shown in FIG. 11A is displayed on a screen.

If the above request is made, the application/UI manager 806 displays the setting menu shown in FIG. 11A on the display unit 826 using OSD (on screen display).

A left menu shown in FIG. 11A schematically represents a main menu. The main menu includes a video relevant setting menu, an audio relevant setting menu . . . and a buffering setting menu. The video relevant setting is to set the substance relevant to video for a screen ratio, an image quality and the like. The audio relevant setting is to set the substance relevant to audio for a sound quality, an audio channel setting and the like. The buffering setting is to set at least one channel explained in the above description to be buffered or to set at least one scene part to be buffered.

A right menu shown in FIG. 11A schematically represents a sub-menu displayed on the screen if the buffering setting menu is selected. And, the sub-menu can be mainly divided into a channel buffering setting and a scene buffering setting.

'Neighbor channel buffering', 'previous viewing channel buffering', 'viewing-reserved channel buffering' and 'user-preferred channel buffering' are the menus for setting at least one channel to be buffered as well as a current viewing channel. And, the 'scene buffering' is the menu for setting at least one scene part to be buffered if a content is provided by a scene unit.

In case of setting the neighbor channel buffering, the receiver buffers a neighbor channel of a currently viewed channel. For instance, if a channel 3 is currently viewed, the receiver buffers a channel previous to the channel 3 and a channel next to the channel 3. A user is able to select the previous channel or the next channel using up and down buttons of a remote controller and the like and is then able to directly view a content of the buffered channel.

In case of setting the previous viewing channel buffering, the receiver buffers a channel previously viewed by a user. For instance, while a channel 3 is currently viewed, if a channel 5 had been viewed, the receiver buffers the channel 5. A user is then able to directly view the channel 5 using a previous viewing channel button, a backward button or the like.

In case of setting the viewing-reserved channel buffering, the receiver buffers a channel for which a viewing reservation has been set. The setting of the viewing reservation can be set using another viewing reservation menu or the like. If a user performs a channel switching to the viewing-reserved channel, the user is able to directly view a corresponding content. Yet, if the viewing reservation setting is not made, it is able to display a message announcing that the viewing reservation setting is not made on the screen.

Figure 11B:
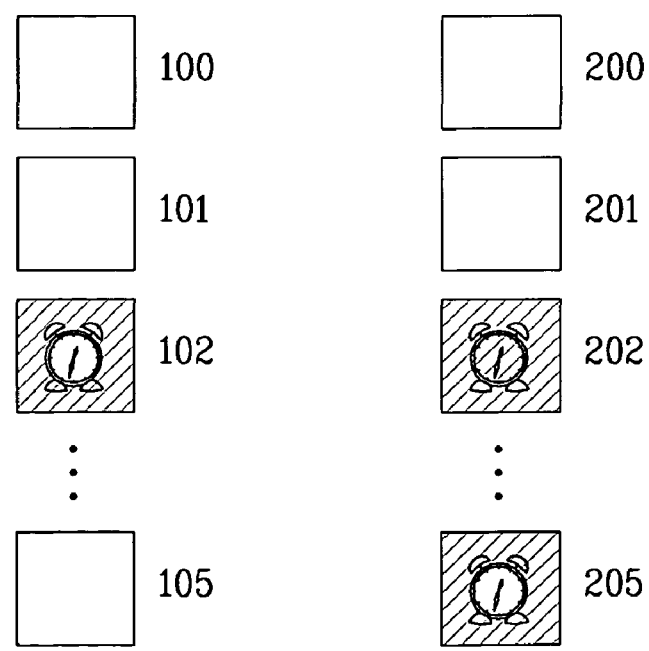
FIG. 11B is a schematic diagram of a menu for selecting a reserved viewing channel according to one preferred embodiment of the present invention.

FIG. 11B is a schematic diagram of a menu for selecting a reserved viewing channel according to one preferred embodiment of the present invention.

Referring to FIG. 11B, reference numbers 100, 101, 102 . . . 205 indicate channel numbers of channels, respectively. The receiver displays the viewable channels on the screen. A user is then able to make a viewing reservation setting of a specific one of the viewable channels. In FIG. 11B, shown is that viewing reservation is made for the channels 102, 202 and 205. Therefore, services corresponding to the channels 102, 202 and 205 can be buffered.

In the example shown in FIG. 11B, a viewing-reserved channel setting menu is schematically configured. Yet, is able to set a viewing-reserved channel on a guide picture such as EPG (electronic program guide) and BCG (broadband content guide) instead of the viewing-reserved channel setting menu.

In case of setting a user-preferred channel buffering, the receiver buffers a channel preferred by a user. The user-preferred channel can be inputted by being set by a user in advance. Alternatively, the user-preferred channel can be automatically set by analyzing a user's channel viewing pattern. For instance, it is able to set a preferred channel in advance on the menu shown in FIG. 11B or the guide picture such as EPG and BCG. Alternatively, by analyzing a user's channel viewing pattern, it is able to automatically set a preferred channel to a channel frequently viewed by a user or a channel belonging to a genre (e.g., sports, drama, etc.) frequently viewed by a user.

In case of setting a scene buffering, the receiver buffers at least one scene part of a content provided by a scene unit. A user selects at least one of specific scenes of the content. The receiver then buffers the selected scene part. If the content s not provided by the scene unit, it is able to display a message announcing that the corresponding function is not supported on the screen.

In the above-explained examples, the number of the buffered channels or the scenes can be varied according to an implemented example by considering a buffering memory and the like. The above-described menu picture, format and name are just exemplary, which do not put limitation on the idea of the present invention.

If the buffering channel or scene is set, the application/UI manager 806 accesses an address capable of sending a content of the corresponding channel or scene using a channel map.

The packet containing the data for the buffering channel or scene is transported to the demultiplexer 822 via the IP manager 804, the CAS/DRM unit 818 and the service delivery manager 820. The application/UI manager 806 sets PID of the packet containing the data for the buffering channel or the buffering scene and the like in the demultiplexer 822. If so, the demultiplexer 822 stores A/V data of the packet having the set PID and the like in the storage medium 834 under the control of the storage medium control unit 832 and then buffers the stored A/V data. In this example, the buffering is performed on the data stored in the storage medium 834. Yet, the buffering can be performed using a transport address of a service and the like.

The buffering space can vary according to an implemented example. And, the buffering space is determined by considering a network status, a space of the storage medium, the number of buffering-set channels and/or the like. For instance, if the network status is not good, it is able to increase the buffering space. If the network status is good, the buffering space is reduced or more channels or scenes are set to be buffered in the same space. The buffering space, the buffering channel number and the like can be set by a user.

If a user selects one of the buffered channels or scenes and then inputs a viewing command, the application/UI manager 806 controls the data buffered in the storage medium 834 to be directly decoded by the video/audio decoder 824.

If a user selects a non-buffered channel or scene and then inputs a corresponding viewing command, data is received in a manner of accessing an address capable of transporting a content or scene of the corresponding channel using a channel map.

Figure 12:
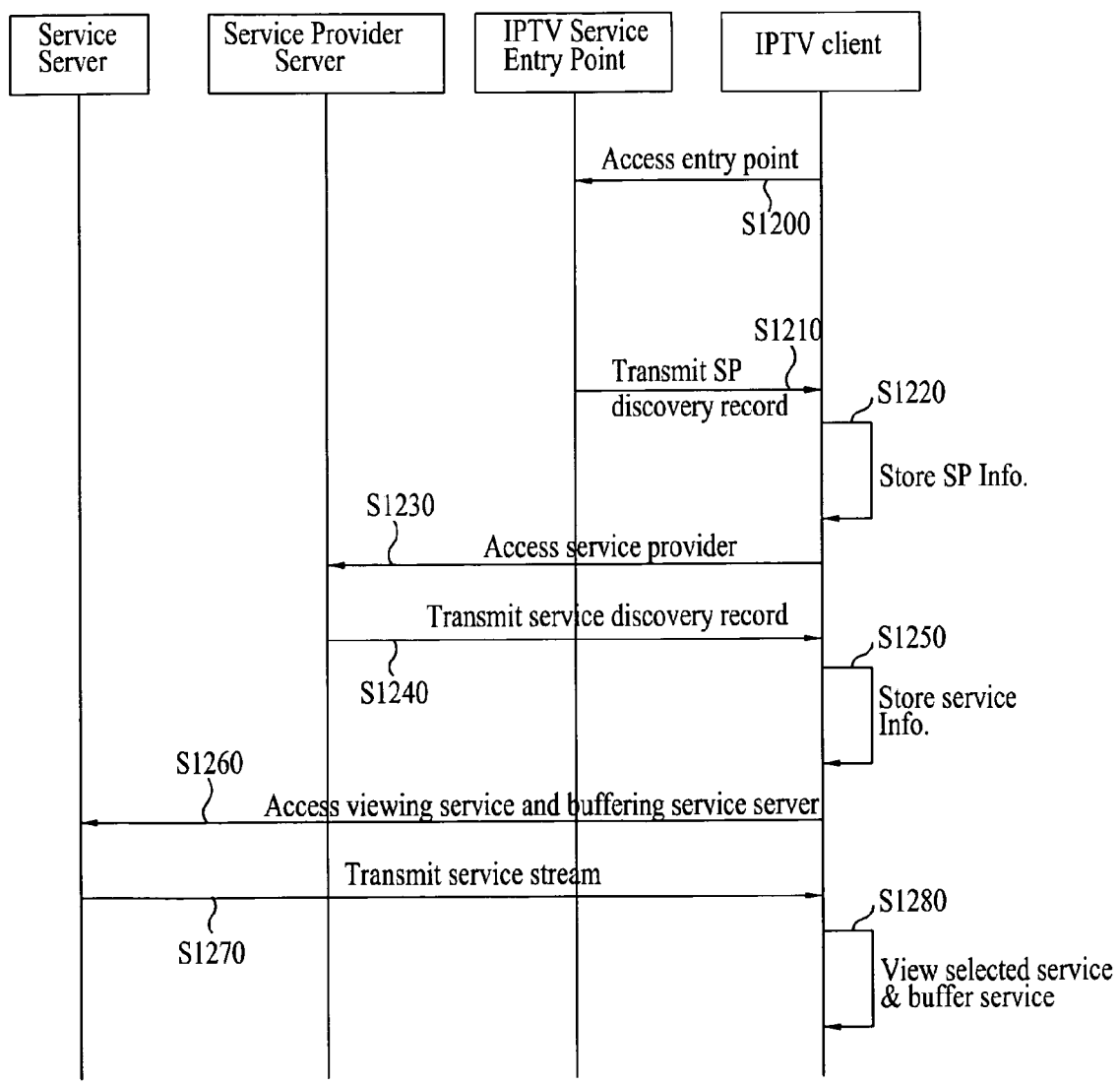
FIG. 12 is a flowchart of a signal processing process according to another embodiment of the present invention.

FIG. 12 is a flowchart of a signal processing process according to another embodiment of the present invention.

FIG. 12 shows a flow and sequence of signals between a service server and a service provider server and between an entry point of an IPTV portal and a receiver. In this case, the service server means a service server in which contents are stored.

Referring to FIG. 12, a receiver accesses an entry point of IPTV portal provided by a network provider [S1200]. The IPTV portal is able to check subscription information of the accessed receiver. In particular, by checking the subscription information or the like, it is able to check whether the receiver is the receiver capable of being provided with a service linked with the IPTV portal.

The entry point of the IPTV portal transports a service provider discovery record including various kinds of informations on the network provider or a service provider to the receiver [S1210].

The receiver stores various kinds of informations included in the received service provider discovery record [S1220]. In this case, the informations can include service provider identification information, service provider connection information and the like.

The receiver accesses a server of the service provider using the connection information on the service provider among the informations [S1230]. If there is an access by the receiver, the server of the service provider transports a service discovery record including various kinds of informations on a service to the receiver [S1240].

The receiver receives the service discovery record and then stores the various informations included in the record [S1250]. In this case, the informations can include content provider identification information, content source identification information, content substance identification information, characteristic information of content data, connection information of service and the like. The receiver is able to make a channel map using the informations.

If a user inputs channel information of a convent to view, the receiver accesses a service server of the corresponding content using the stored information and the channel map. In case that the user sets a buffering channel or scene, the receiver accesses an access address of the buffering channel or scene [S1260].

The service server initiates a streaming service by transporting a data stream to the accessed receiver [S1270]. The receiver displays the content, for which the user has inputted the viewing command, of the data received from the service server on the screen and buffers to store the contents of the buffering-set channel or scene [S1280].

Figure 13:
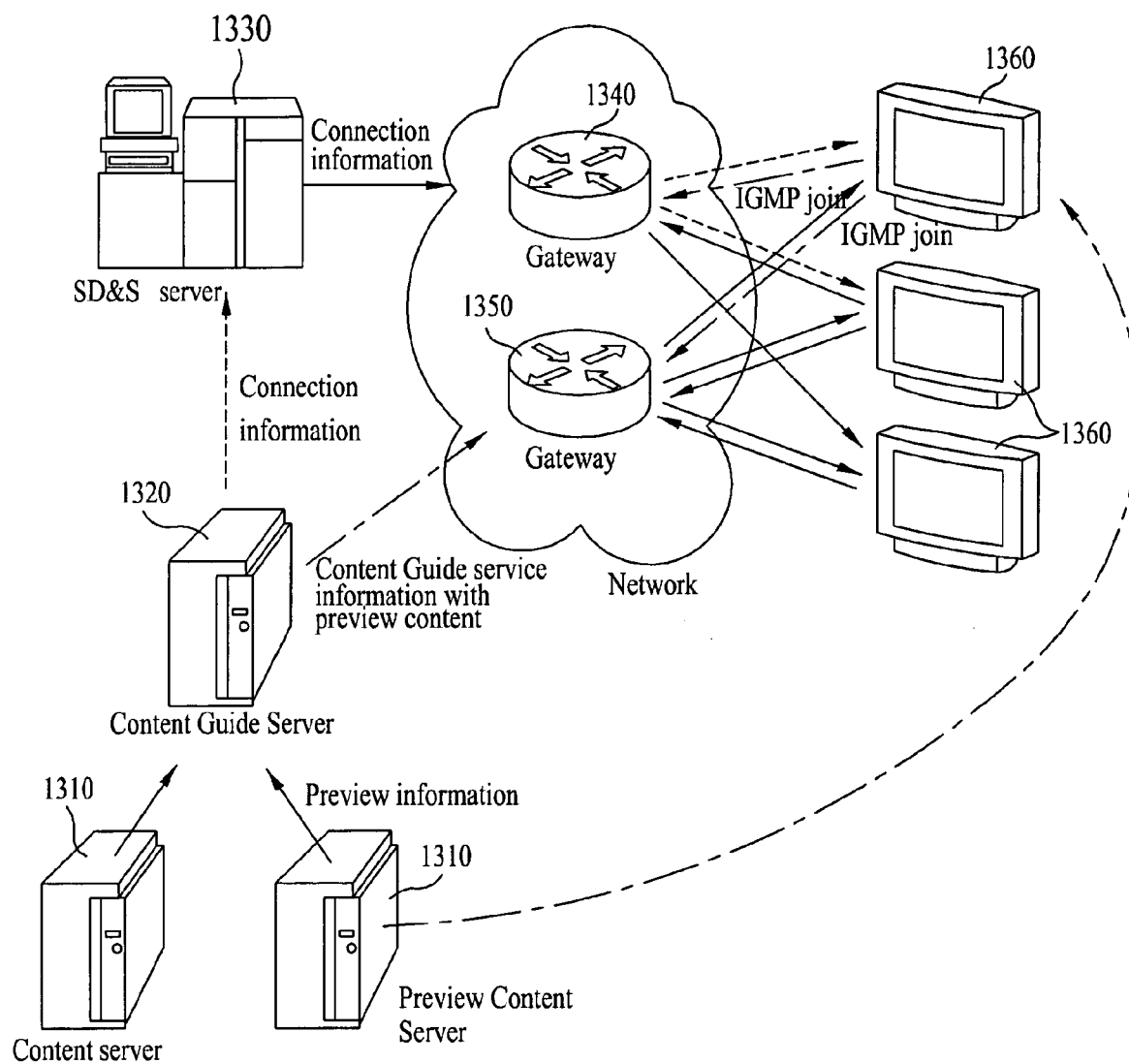
FIG. 13 is a diagram of an IP system according to another preferred embodiment of the present invention.

FIG. 13 is a diagram of an IP system according to another preferred embodiment of the present invention.

Referring FIG. 13, a transport system of the present invention includes a content server 1300, a preview content server 1310, a content guide server, an SD&S (service discovery & selection) server 1330, a first gateway 1340, a second gateway 1350 and a receiving device 1360.

The content server 1300 stores a plurality of contents therein and provides the content guide server 1320 with names of the contents and information of a content guide service containing description.

Preview content for each of a plurality of the contents is stored in the preview content server 1310 in advance. For instance, the preview content includes an audio signal of a corresponding content, a text of a corresponding content, AV (audio and video) signal of a preview program for previewing a corresponding content and/or a representative still picture of a corresponding content.

The content guide server 1320 provides the SD&S server 1330 with connection information on the various servers that provide prescribed services via network. In particular, the content guide server 1320 provides the SD&S server 1330 with the connection information for accessing the content server 1300, the preview content server 1310 and the content guide server 1320. The connection information provided by the content guide server 1320 contains information for noticing a presence or non-presence of a preview content and discrimination information for discriminating the preview content in case of the presence of the preview content.

The content guide server 1320 stores information of a content guide service provided by the content server 1300 and plays a role in providing the stored information of the content guide service to the receiving device 1360. The content guide server 1320 receives preview contents for a plurality of contents from the preview content server and then stores the received preview contents. The content guide server 1320 is then able to provide the preview contents together with the information of the content guide service in case of providing the information of the content guide service to the receiving device 1360.

The SD&S server 1330 receives the connection information on the various servers provided by the content guide server 1320 and then stores the received connection information. And, the SD&S server 1330 provides the stored connection information to the receiving device 1360 according to a request made by the receiving device 1360.

If the receiving device 1360 is booted, it makes a request for the connection information to the SD&S server 1330 in the first place. In particular, the receiving device 1360 accesses the SD&S server 1300 via the first gateway 1340 and then makes the request for the connection information on the content server 1300, the preview content server 1310 and the content guide server 1320. In response to the request, the SD&S server 1330 provides the connection information to the receiving device 1360.

The request and transmission of the connection information between the receiving device 1360 and the SD&S server 1330 follow the unicast system. Hence, the first gateway 1340 supports the unicast.

The unicast system is the system for transporting information by 1:1. If the receiving device makes a request for connection information to the SD&S server 1330, the SD&S server 1330 transports the connection information to the receiving device 1360 in response to the request.

The receiving device 1360 registers to SD&S group of the first gateway 1340 using IGMP (internet group management protocol). The receiving device 1360 having registered to the SD&S group is then able to receive connection information for various servers, playback information and the like, which are provided by the SD&S server 1330 by multicast system. Hence, the fist gateway 1340 supports the multicast system as well.

The multicast system enables a great quantity of data to be transported to a plurality of the receiving devices 1360 belonging to the SD&S group simultaneously. The SD&S server 1330 periodically transports the connection information on the various servers to the receiving device 130 having registered to the SD&S group by the multicast system.

For instance, in case of DVB-IP (digital video broadcasting over internet protocol), the transmission of the connection information is performed in a manner that a table of BCG (broadband content guide) discovery record containing access information of the content guide server 1320 is transported to the receiving device 1360.

Looking into ETSI (European telecommunication standards institute) TS (technical specification) 102 034, which is the specifications of the DVB-IP, the connection information on the content guide server 1320 is contained in the table of the BCG discovery record.

In the specifications of the DVB-IP, the unicast system is regulated to use HTTP (Hyper-text transport protocol) as SD&S protocol for the SD&S server to provide the connection information. And, the multicast system is regulated to use DVBSTP (digital video broadcasting SD&S transport protocol).

The SD&S server 1330 uses the DVBSTP to transmit the table of the BCG discovery record by the multicast system.

According to the present invention, the table of the BCG discovery record contains information indicating a presence or non-presence of a preview content and discrimination information from discriminating the preview content in case of the presence of the preview content.

The receiving device 1360 accesses the content guide server 1320 using the connection information contained in the table of the BCG discovery record and then makes a request for information of a content guide service. The request for the information of the content guide service is performed by the unicast system.

The receiving device 1360 makes a request for the content guide service information stored in the content guide server 1320 via the second gateway 1350 connected to the content guide server 1320. And, the second gateway 1350 supports the unicast system.

By the unicast system, the receiving device 1360 is able to make the request for the information of the content guide service to the content guide server 1320 and the content guide server 1320 then transports the information of the content guide service to the receiving device 1360 in response to the request. In case that query is supported, the receiving device 1360 selectively makes a request for the necessary information of the content guide service to the content guide server 1320 and can be then provided with the necessary information selectively.

In this case, between the content guide server 1320 and the receiving device 1360, the information of the content guide service is requested and then provided using a simple object access protocol, a hyper-text transport protocol or the like.

The content guide server 1320 provides the information of the content guide service to the corresponding receiving device 1360 if the request for the information of the content guide service is inputted by the receiving device 1360.

In case that the content guide server 1320 provides the information of the content guide service to the receiving device 1360, the content guide server 1320 can transport the preview content inputted by the preview content server 1310 together with the information of the content guide service. Moreover, the receiving device 1360 decides a presence or non-presence of a preview content without being provided with a preview content by content guide server 1320. In case of deciding the presence of the preview content, the receiving device 1360 makes a request for a preview content by directly accessing content guide server 1320 using the connection information contained in the table of the BCG discovery record. The receiving device 1360 is then able to be provided with the preview content by the content guide server 1320 according to the request.

FIG. 14 is a table of BCG discovery record according to one preferred embodiment of the present invention.

Referring to FIG. 14, in a table of BCG discovery record, a BCG offering type 'BCGOffering type' indicates a table of 'BCGDiscovery'.

'BCG' means a BCG record.

'BCG@Id' means an identifying sign of a provider/server that provides BCG. The identity sign is allocated by a service provider.

'BCG@version' means version information of BCG. If the version information of the BCG is modified, it announces that BCG data is updated.

'Name' means a name of the BCG. The name of the BCG can be provided through at least one language.

'Description' means the description for the BCG. The description for the BCG can be provided through at least one language.

'Logo' means a pointer to a logo for BCG.

'Type' includes type information of a content related to BCG. For instance, the type of the content can include Live Program, COD (Content On Demand) or one of other types.

'TargetProvider' include domain name information on a provider of a content provider described in BCG.

'TransportMode' includes location information for discovering BCG data.

'DVBSTP' within 'TransportMode' includes location information of BCG provided using DVBSTP protocol.

'http@Location' within 'TransportMode' includes location information of BCG provided using HTTP protocol.

'http@SOAP' within 'TransportMode' includes information indicating whether BCG provided using HTTP protocol uses SOAP protocol. And, a default value is 'false'.

'BCGProviderName' includes name information of a BCG provider.

In the table of the BCG discovery record, the present invention further includes 'PreviewAvailability' and 'PreviewInformation'.

The 'PreviewAvailability' indicates whether a preview content exists. If the preview content does not exist, a default value is 'false'.

And, the 'PreviewInformation' indicates information on the preview content if the preview content exists.

FIG. 15 is a table of information on preview contents according to one preferred embodiment of the present invention.

Referring to FIG. 15, a table about information of a preview content includes 'PreviewCategory', 'PreviewMediaType@id', 'DisplayMode', 'Position', 'Size', 'StareTime', 'Duration', 'PreviewDescription', 'MediaLocator' and 'AssociatedMediaLocator'.

The 'PreviewCategory' indicates that such a type of a preview content as series, sports, action, art and the like.

The 'PreviewMediaType@id' indicates that a preview content indicates a predefined media format type for an image, a moving picture, an audio or a text.

The 'DisplayMode' indicates a display mode such as a slide, a trail and the like when a media is displayed.

The 'Position' designates a position where a preview content will be displayed.

The 'Size' indicates a size to display a preview content.

The 'StartTime' indicates a start timing point of a preview content.

The 'Duration' indicates a total time for displaying a preview content.

The 'PreviewDescription' is a simple description for a preview content.

The 'MediaLocator' indicates an address at which a preview content exists. The address is in a format of URI (Uniform Resource Identifier) and all transport protocols are available.

The 'AssociatedMediaLocator' indicates an address of a content associated with a preview by CRID.

FIG. 16 is a table of definitions for a preview media type 'PreviewMediaType@id' in a table for information 'PreviewInformation' on the preview content shown in FIG. 15.

Referring to FIG. 16, in case that a preview content is an image, it is indicated whether the preview content is formatted by GIG (Graphics interchange Format), JPEG (Joint Photographic coding Experts Group), TIFF (Tagged Image File Format), XBM (X Bit Map) or the like.

If a preview content is a text, it is indicated whether the preview content is the text a plain ASCII (American Standard Code for Information Interchange) text or a text formatted by HTML (Hyper-Text Markup Language) or XML (eXtensible Markup Language).

If a preview content is an audio, it is indicated whether the preview content is a basic audio or an audio formatted by MPEG (moving picture experts group) or window wave file (WAV).

If a preview content is a video, it is indicated whether the preview content is a video formatted by Quicktime or AVI (audio video interleaving).

If the receiving device 1360 is booted, the application/UI manager 806 accesses the SD&S server 1320 and then makes a request for connection information via the service control manager 816, the IP manager 804 and the network interface unit 802. In response to the request for the connection information, the SD&S server 1320 provides a table of a BCG discovery record, which is the connection information, to the receiving device 1360. In the table of the BCG discovery record, the connection information for enabling the receiving device 1360 to access the content server 1300, the preview content server 1310 and the content guide server 1320 is included. Moreover, in the table of the BCG discovery record, as mentioned in the foregoing description, information for noticing a presence or non-presence of a preview content and discrimination information for discriminating the preview content in case of the presence of the preview content are included.

The table of the BCG discovery record provided by the SD&S server 1320 is received via the network interface unit 802 and a packet including the received table of the BCG discovery record is then inputted to the IP manager 804.

The IP manager 804 checks whether a destination of the packet inputted from the network interface unit 802 is the receiving device 1360. If the destination is the receiving device 1360, IP manager 804 forwards the corresponding packet to a suitable manager block according to transmission/reception protocol.

The table of the BCG discovery record is transmitted for the SD&S server 1320 to provide the connection information of the content server 1310 and the like. Hence, the IP manager 804 forwards the packet including the table of the BCG discovery record to the service discovery manager 814.

The service discovery manager 814 manages the connection information on the servers that provide various services. The service discovery manager 814 obtains the connection information of the content guide server 1320 by parsing the table of the BCG discovery record and then forwards the obtained connection information of the content guide server 1320 to the application/UI manager 806.

The application/UI manager 806 accesses the content guide server 1320 along the connection information of the content guide server via the service discovery manager 814, the IP manager 804 and the network interface unit 802 and then makes a request for information of a content guide service.

If the request for the information of the content guide service is received from the receiving device, the content guide server 1310 transmits the information of the content guide service. In case that the request for the information of the content guide service is selectively made according to the query scheme, the selectively requested information of the content guide service is transmitted to the receiving device. In this case, for a content of which preview content exists in the information of the content guide service, the content guide service 1310 previously reads the content from the preview content server 1310 and then stores the read preview content. In case that the information of the content guide service is to be provided to the receiving device, it can be provided to the receiving device together with the read preview content.

The information of the content guide service provided by the content guide server 1310 is received via the network interface unit 802. The received information of the content guide service is forwarded to the application/UI manager 806 via the IP manager 804.

The allocation/UI manager 806 stores the received information of the content guide service in the service information database unit 812 and then manages the stored information of the content guide service. If a key signal for a display command for a content guide is inputted by a user, the information of the content guide service is displayed on the display unit 926 together with the preview content using OSD or the like.

If the content guide server 1310 does not provide a preview content by providing the information of the content guide service, the application/UI manager 806 checks contents, for which preview contents exist, using the table of the BCG discovery record provided by the SD&S server 1320. If the contents having the preview contents are checked, the application/UI manager 806 accesses the preview content server 1320 according to the connection information of the preview content server 1310 via the service discovery manager 814, the IP manager 804 and the network interface unit 802 and then makes a request for the preview contents.

In response to the request for the preview contents, the preview content server 1310 provides the corresponding preview contents. The preview contents provided by the preview content server 1310 are received via the network interface unit 802. The received preview contents are forwarded to the application/UI manager 806 via the IP manager 804.

The application/UI manager 806 stores the preview contents in the service information database 812 and then manages the stored preview contents. If a key signal for a display command of a content guide is inputted by a user, the information of the content guide is displayed together with the preview content on the display unit 826 using OSD and the like.

Figure 17:
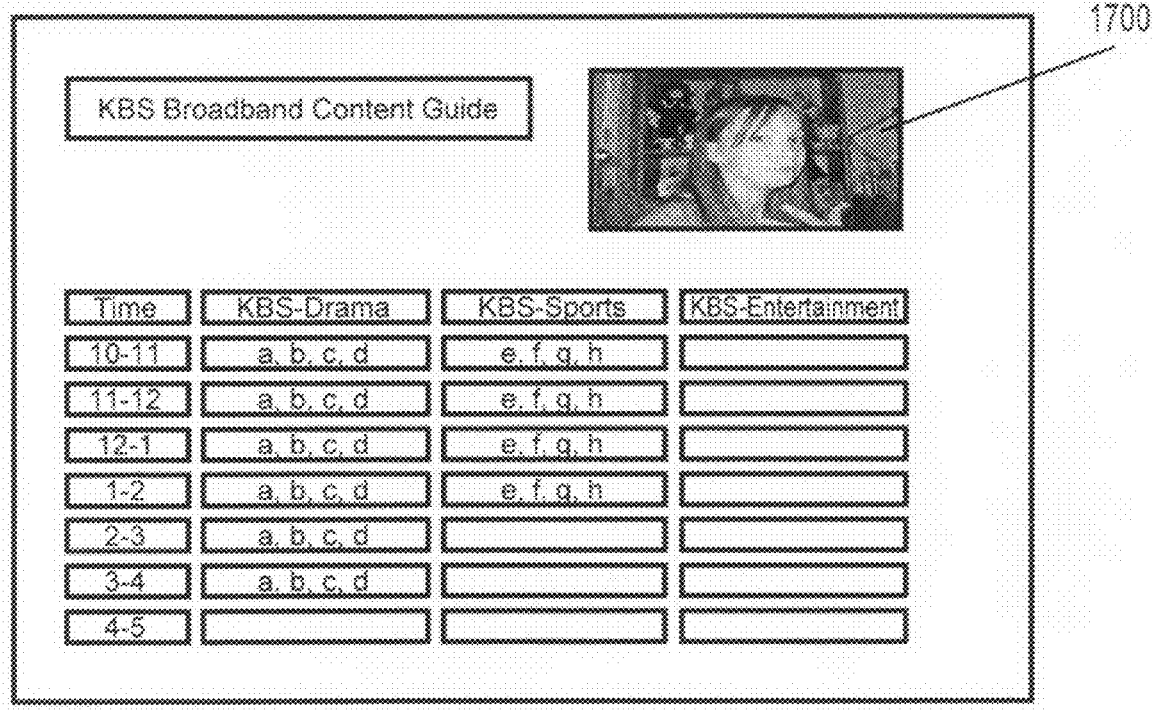
FIG. 17 and FIG. 18 are diagrams to explain that a broadcast receiver according to the present invention displays preview contents on a screen.

For example of the display of the information of the content guide information, as shown in FIG. 17, a content guide is displayed on a bottom of a screen. If a preview content for a content indicated by a cursor exists, the preview content is displayed on a display area 1700 at a right top of the screen. Therefore, a user is able to check the preview content.

In this case, the displayed preview content can include both a moving picture and a still picture. If the preview content is audio data, it is not displayed on the display area 1700 but the audio can be outputted via speaker.

Figure 18:
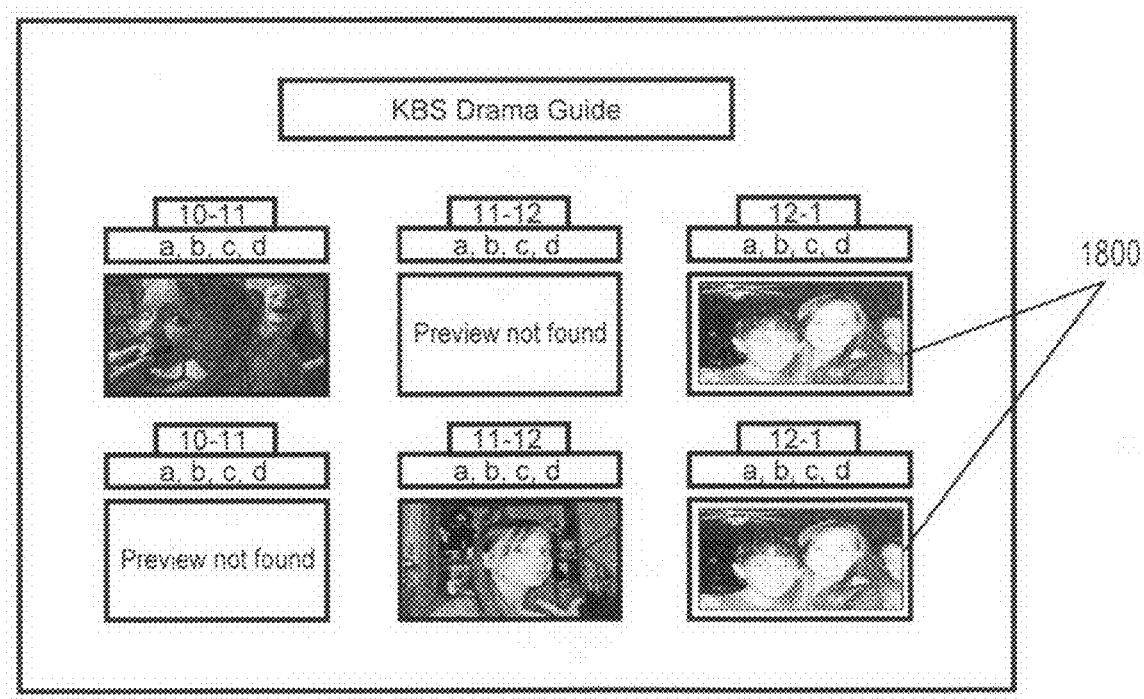

For example of the display of the information of the content guide information, as shown in FIG. 18, each display area 1800 is set below each content displayed on a screen. And, a corresponding preview content can be displayed on each display area 1800.

In this case, a user is preferably informed that a preview content does not exist in a manner of displaying 'Preview not found' on the display area 1800 of the content having no preview content.

If an audio signal is included in a preview content and if the audio signal is entirely outputted to a speaker, a user is unable to correctly listen to the audio signal. Therefore, in case of attempting to display the information of the content guide service, the application/UI manager 806 decides a content at which a cursor is located and then enables the audio signal corresponding to the preview content of the decided content to be preferably outputted via the speaker.

Figure 19:
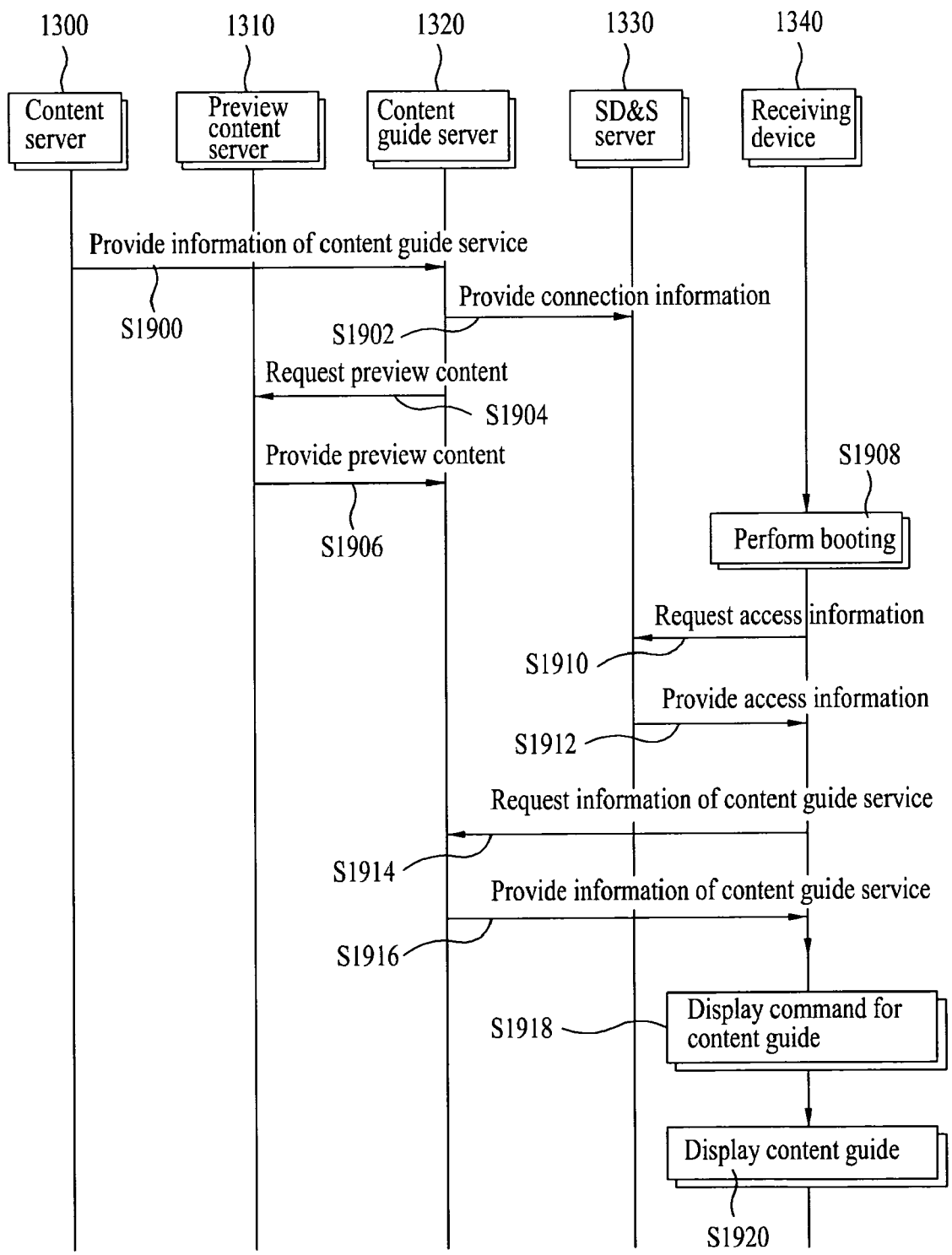
FIG. 19 is a flowchart of a signal processing method according to another preferred embodiment of the present invention.

FIG. 19 is a flowchart of a signal processing method according to another preferred embodiment of the present invention.

Referring to FIG. 19, a content server 1300 provides information of a content guide service to a content guide server 1320 [S1900].

The content guide server 1320 provides connection information to an SD&S server 1330 [S1902]. In this case, the connection information includes the connection information enabling a receiving device 1360 to access the content server 1300, the preview content server 1310 and the content guide server 1320. Moreover, the connection information contains information for noticing a presence or non-presence of a preview content and discrimination information for discriminating the preview content in case of the presence of the preview content.

In this case, the above steps S1900 and S1902 are sequentially represented for convenience. Alternatively, after the content guide server 1320 has provided the connection information to the SD&S server 1330, the content server 1300 can provide the information of the content guide service to the content guide server 1320. Alternatively, both of the connection information and the information of the content guide service can be simultaneously provided.

The content guide server 1320 decides a content having a preview content in the information of the content guide service provided by the content server 1300. As a result of the decision, if the content having the preview content exists, the content guide server 1320 makes a request for the corresponding preview content to the preview content server 1310 [S1904]. In response to the request, the preview content server 1310 provides the corresponding preview content to the content guide server 1320 [S1906].

After the receiving device 1360 has been booted [S1908], if the booting is completed, it accesses the SD&S server 1330 and then makes a request for connection information [S1910]. If so, the SD&S server 1330 provides the receiving device 1360 with a table of a BCG discovery record which is the connection information containing the information for noticing a presence or non-presence of a preview content and the discrimination information for discriminating the preview content in case of the presence of the preview content [1912].

The receiving device 1360 receives the connection information provided by the SD&S server 1330. The receiving device 1360 accesses the content guide server 1320 according to the received connection information and then makes a request for information of a content guide service [S1914]. If so, the content guide server 1320 provides the information of the content guide service to the receiving device 1360 in response to the request. In this case, the content guide server 120 provides a preview content together with the information of the content guide service [S1916].

Subsequently, the receiving device 1360 decides whether a key signal for a display command for a content guide is inputted by a user [S1918]. As a result of the decision, if the display command for the content guide is inputted, the receiving device 1360 displays the information of the content guide service on the display unit 826. In particular, the receiving device 1360 displays the information of the content guide service including the preview content, as shown in FIG. 17 or FIG. 18, on the screen for example [S1920].

Figure 20:
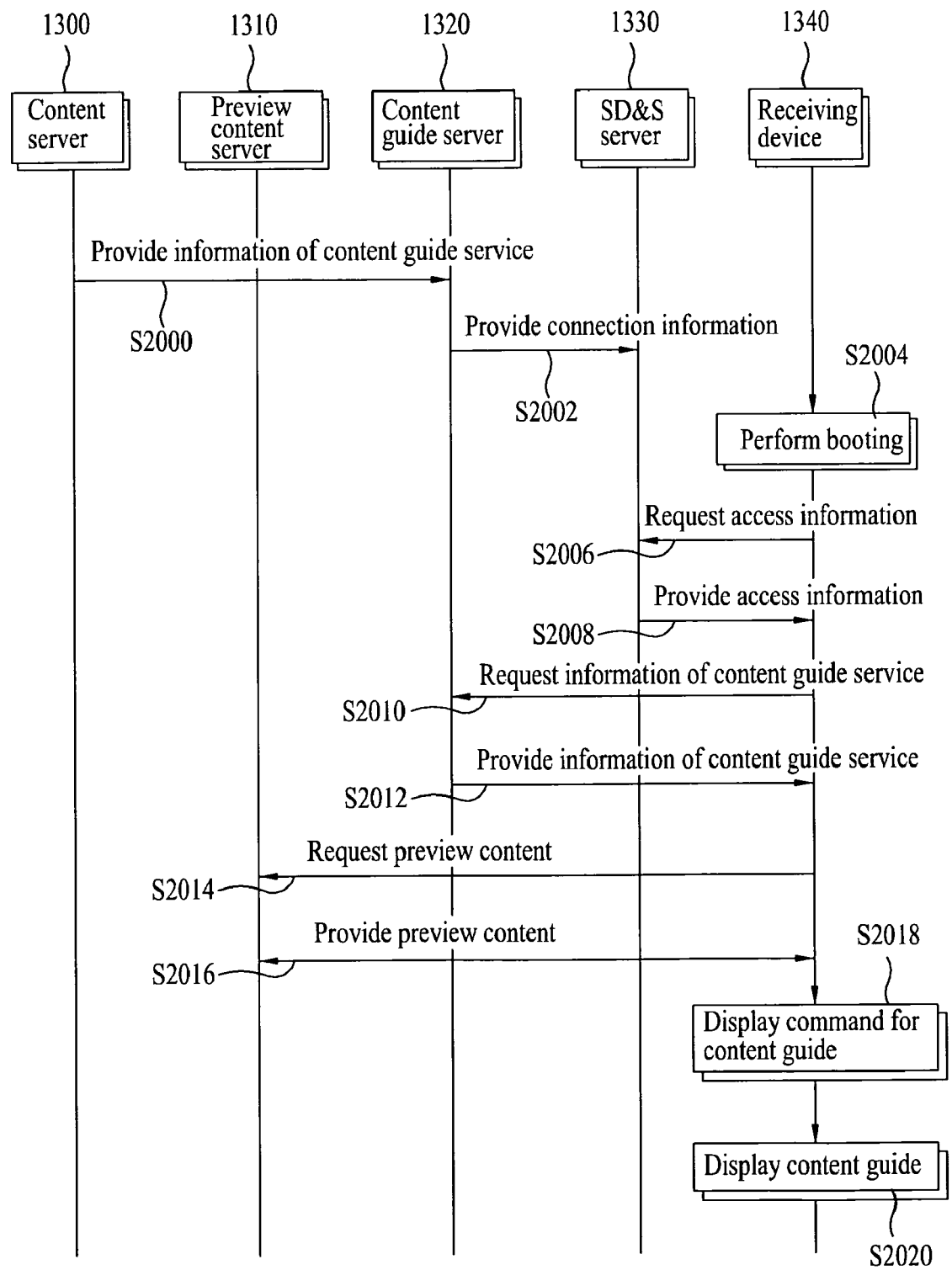
FIG. 20 is a flowchart of a signal processing method according to a further preferred embodiment of the present invention.

FIG. 20 is a flowchart of a signal processing method according to a further preferred embodiment of the present invention.

Referring to FIG. 20, a content server 1300 provides information of a content guide service to a content guide server 1320 [S2000]. The content guide server 1320 provides connection information to an SD&S server 1330 [S2002]. In this case, as mentioned in the foregoing description of the former embodiment, the connection information includes the connection information enabling a receiving device 1360 to access the content server 1300, the preview content server 1310 and the content guide server 1320. Moreover, the connection information contains information for noticing a presence or non-presence of a preview content and discrimination information for discriminating the preview content in case of the presence of the preview content.

After the receiving device 1360 has been booted [S2004], if the booting is completed, a request for connection information is made to the SD&S server 1330 [S2006]. If so, the SD&S server 1330 provides the receiving device 1360 with the information for noticing a presence or non-presence of a preview content and a BCG discovery record which is the connection information containing the information on the preview content [S2008].

If the SD&S server 1330 provides the connection information, the receiving device 1360 receives the connection information. The receiving device 1360 accesses the content guide server 1320 according to the received connection information and then makes a request for information of a content guide service [S2010]. If so, the content guide server 1320 provides the information of the content guide service to the receiving device 1360 in response to the request [S2012].

The receiving device 1360 decides a content having a preview content using the connection information provided by the SD&S server 1330. If the content has the preview content, the receiving device 1360 accesses the preview content server 1310 and then makes a request for the preview content [S2014]. If so, the preview content server 1310 provides the corresponding preview content to the receiving device 1360 in response to the request [S2016].

Subsequently, the receiving device 1360 decides whether a key signal for a display command for a content guide is inputted by a user [S2018]. As a result of the decision, if the display command for the content guide is inputted, the receiving device 1360 displays the information of the content guide service on the display unit 826. In particular, the receiving device 1360 displays the information of the content guide service including the preview content, as shown in FIG. 17 or FIG. 18, on the screen for example [S2020].

In this case, the receiving device 1360 accesses the preview content server 1310 and then requests the preview content in advance. After the receiving device 1360 has been provided with the preview content corresponding to the request, if the display command for the content guide is inputted, the information of the content guide service including the preview content is displayed on the screen for example.

Alternatively, in implementing the present invention, the receiving device 1360 is not provided with the preview content by the preview content server 1310 in advance. If the display command for the content guide is inputted, the receiving device 1360 accesses the preview content server 1310 and then requests the preview content. In response to the request, the receiving device 1360 is provided with the preview content. The information of the content guide service including the preview content can be then displayed on the screen.

Accordingly, the present invention is applicable to an IPTV system using internet protocol. And, the present invention is applicable to a system that needs a separate request in channel switching or a system that takes a switching delay in channel switching.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving broadcast data, comprising the steps of:
    receiving a service discovery information packet including first information on a service and extracting the first information included in the service discovery information packet, the service discovery information packet further including second information on a preview for the service;
    storing the first information extracted from the service discovery information packet and making a channel map using the stored first information; and
    receiving a first stream including the service and preview using the channel map,
    wherein the first information includes first element providing a first IP (internet Protocol) multicast address at which the service is accessed, and second element indicating whether a streaming of the service from the multicast address uses a RTP (Real Time Protocol) or a direct UDP (User Datagram Protocol),
    wherein the second information further includes at least one of third element indicating preferred preview among multiple previews for the service, the multiple previews being included in the first stream, fourth element specifying DVB triplet information of the preview, fifth element indicating a first IP multicast address for the preview, and sixth element indicating maximum bitrate for data of the preview.

2. The method of claim 1, wherein in the stream receiving step, a stream for the service of a display requested channel on a screen and receiving is received and displayed and a stream for the service of at least one buffering-set channel is buffered.

3. The method of claim 2, wherein the buffering-set channel comprises at least one selected from the group consisting of a neighbor channel of the display requested channel, a previously viewed channel, a user-specific viewing reserved channel and a user-preferred channel.

4. The method of claim 1, wherein in the stream receiving step, a stream of a currently displayed part in a content service provided divided into at least one or more parts is received and displayed on a screen and a stream of at least one buffering-set part is received and buffered.

5. The method of claim 1, further comprising:
    displaying the preview in the course of channel switching.

6. The method of claim 1, further comprising:
    buffering the preview.

7. The method of claim 1, further comprising:
    displaying the preview on the screen, wherein the second information includes seventh element indicating an existence of the preview.

8. A broadcast receiver comprising:
    a service discovery manager receiving a service discovery information packet including first information on a service and extracting the first information included in the service discovery information packet, the service discovery information packet further including second information on a preview for the service;
    a service information database unit storing the first information extracted from the service discovery information packet;
    a channel manager making a channel map using the stored first information, and managing the channel map; and
    an application/UI manager receiving a first stream including the service and preview using the channel map,
    wherein the first information includes first element providing a first IP (internet Protocol) multicast address at which the service is accessed, and second element indicating whether a streaming of the service from the multicast address uses a RTP (Real Time Protocol) or a direct UDP (User Datagram Protocol),
    wherein the second information further includes at least one of third element indicating preferred preview among multiple previews for the service, the multiple previews being included in the first stream, fourth element specifying DVB triplet information of the preview, fifth element indicating a first IP multicast address for the preview, and sixth element indicating maximum bitrate for data of the preview.

9. The broadcast receiver of claim 8, the application/UI manager receives a stream for the service of a display requested channel, displays the stream on a screen, receives a stream for the service of at least one buffering-set channel, and controls the stream to be buffered.

10. The broadcast receiver of claim 8, further comprising a storage unit receiving and storing the stream for the service of the buffering-set channel.

11. The broadcast receiver of claim 8, wherein the application/UI manager receives a stream of at least one buffering-set part of a content service divided into at least one part, displays the stream, receives a stream of at least one buffering-set part, and controls the stream to be buffered.

12. The broadcast receiver of claim 8, wherein the application/UI manager displays the preview on a screen in the course of channel switching.

13. The broadcast receiver of claim 8, wherein the application/UI manager controls the preview to be displayed on the screen, and the second information includes seventh element indicating an existence of the preview.

* * * * *